(12) United States Patent
Tal et al.

(10) Patent No.: US 11,565,801 B2
(45) Date of Patent: Jan. 31, 2023

(54) AERIAL TRANSPORTATION SYSTEM

(71) Applicant: FLYON Aerosystems Ltd., Tel-Aviv (IL)

(72) Inventors: Oren Tal, Kfar-Sava (IL); Reuven Tal, Tel-Aviv (IL)

(73) Assignee: FLYON AEROSYSTEMS LTD., Kfar-Sava (IL)

( * ) Notice: Subject to any disclaimer, the term of this patent is extended or adjusted under 35 U.S.C. 154(b) by 224 days.

(21) Appl. No.: 16/664,913

(22) Filed: Oct. 27, 2019

(65) Prior Publication Data

US 2020/0055594 A1 Feb. 20, 2020

Related U.S. Application Data

(63) Continuation-in-part of application No. PCT/IL2018/050468, filed on Apr. 29, 2018.
(Continued)

(51) Int. Cl.
*B64D 11/00* (2006.01)
*B64F 1/31* (2006.01)
(Continued)

(52) U.S. Cl.
CPC ............ *B64C 27/50* (2013.01); *B64C 1/1423* (2013.01); *B64C 29/0025* (2013.01); *B64D 11/00* (2013.01); *B64F 1/31* (2013.01)

(58) Field of Classification Search
CPC ......... B64C 27/50; B64C 11/28; B64C 27/08; B64C 2201/108; B64C 29/02; B64F 1/31;
(Continued)

(56) References Cited

U.S. PATENT DOCUMENTS

| 3,605,935 A | 9/1971 | Gilbert |
| 3,785,316 A | 1/1974 | Leming |

(Continued)

FOREIGN PATENT DOCUMENTS

| DE | 102014115926 A1 | 5/2016 | |
| DE | 102019132056 A1 * | 5/2021 | .............. B64F 1/227 |

(Continued)

OTHER PUBLICATIONS

Lifting body design and CPD analysis of a novel long range pentacopter—Daniel Cagatay and Haoqian Yuan, Master Thesis in Aerospace Engineering, The Royal Institute of Technology.
(Continued)

*Primary Examiner* — Joshua J Michener
*Assistant Examiner* — Cindi M Curry
(74) *Attorney, Agent, or Firm* — Mark M. Friedman

(57) ABSTRACT

An aerial vehicle has a passenger cabin for receiving at least one passenger, a load-bearing structure beneath the cabin, and a propulsion system including a number of propulsion units, which propel the aerial vehicle for powered flight and vertical take-off and landing (VTOL). The propulsion units are preferably carried by support arms attached to the load-bearing structure and extending upwards therefrom so as to support the propulsion units at a level above the cabin. The aerial vehicle is preferably reconfigurable to a compact configuration after landing, with at least some of the propulsion units overlapping the cabin and/or each other, while still allowing passenger transfer in and out of the vehicle, thereby facilitating efficient use of space for implementing a vertiport.

5 Claims, 23 Drawing Sheets

Related U.S. Application Data

(60) Provisional application No. 62/572,493, filed on Oct. 15, 2017, provisional application No. 62/502,793, filed on May 8, 2017, provisional application No. 62/490,622, filed on Apr. 27, 2017.

(51) Int. Cl.
  *B64C 27/50* (2006.01)
  *B64C 1/14* (2006.01)
  *B64C 29/00* (2006.01)

(58) Field of Classification Search
  CPC .. B64F 1/00; B64F 1/002; B64F 1/007; B64F 1/222; B64F 1/225; B64F 1/227; B64F 1/228; B64F 1/24; B64F 1/36
  See application file for complete search history.

(56) References Cited

U.S. PATENT DOCUMENTS

| | | | |
|---|---|---|---|
| 5,218,921 A | 6/1993 | Malcolm | |
| 5,364,046 A | 11/1994 | Dobbs et al. | |
| 5,701,966 A * | 12/1997 | Amico | B62D 57/00 180/6.66 |
| 7,957,521 B2 | 6/2011 | Taylor et al. | |
| 8,181,725 B2 * | 5/2012 | Andres | B64C 25/50 180/14.4 |
| 8,243,914 B2 | 8/2012 | Taylor et al. | |
| 8,401,545 B2 | 3/2013 | Tal | |
| 9,527,605 B1 | 12/2016 | Gentry et al. | |
| 9,663,237 B2 | 5/2017 | Senkel et al. | |
| 9,783,075 B2 * | 10/2017 | Henry | B64F 1/362 |
| 2009/0008499 A1 * | 1/2009 | Shaw | B64C 27/08 244/17.23 |
| 2010/0096494 A1 * | 4/2010 | Braier | B64F 1/228 244/50 |
| 2010/0294188 A1 | 11/2010 | Wang | |
| 2011/0042507 A1 | 2/2011 | Seiford, Sr. | |
| 2014/0319272 A1 * | 10/2014 | Casado | B60L 53/14 244/110 E |
| 2015/0353080 A1 | 12/2015 | Mukaiyama | |
| 2016/0207368 A1 | 7/2016 | Gaonjur | |
| 2017/0008515 A1 | 1/2017 | Seo et al. | |
| 2017/0253349 A1 * | 9/2017 | Wang | B64C 39/024 |
| 2017/0283090 A1 * | 10/2017 | Miller | B60L 53/80 |
| 2017/0305547 A1 * | 10/2017 | Tamkin, Sr. | B08B 1/001 |
| 2017/0313305 A1 | 11/2017 | Irion et al. | |
| 2018/0134413 A1 * | 5/2018 | Halsey | B64F 1/364 |
| 2019/0176956 A1 | 6/2019 | Chen | |
| 2020/0152939 A1 * | 5/2020 | Yang | B64D 27/24 |
| 2021/0080974 A1 * | 3/2021 | Mackin | B60P 3/42 |

FOREIGN PATENT DOCUMENTS

| | | | |
|---|---|---|---|
| ES | 2683546 T3 * | 9/2018 | ............ B64F 1/228 |
| WO | 2008147484 A2 | 12/2008 | |
| WO | 2016195320 A1 | 12/2016 | |
| WO | 2019020158 A1 | 1/2019 | |

OTHER PUBLICATIONS

Perception and Control Strategies for Autonomous Docking for Electric Freight Vehicles, Leopoldo Gonzalez Clarembaux et al., Transportation Research Procedia 14 (2016), pp. 1516-1522, 6th Transport Research Arena Apr. 18-21, 2016.
Airbus—Internet web page: https://www.airbus.com/en/innovation/zero-emission/urban-air-mobility.
Ehang—Internet web page: https://www.ehang.com/.
Ehang 184 Autonomous Aerial Vehicle (AAV)—Internet web page: https://www.aerospace-technology.com/projects/ehang-184-autonomous-aerial-vehicle-aav/.
Google delivery drones—Internet web page: https://www.youtube.com/watch?v=vd8HmgkDhoU.
Lilium—Internet web page: https://lilium.com/.
Michelin—Internet web page: https://www.michelin.com/.
Stratasys—Internet web page: https://www.stratasys.com/.
Uber—Internet web page: https://www.uber.com/il/en/elevate/.
Volocopter—Internet web page: https://www.volocopter.com/.

* cited by examiner

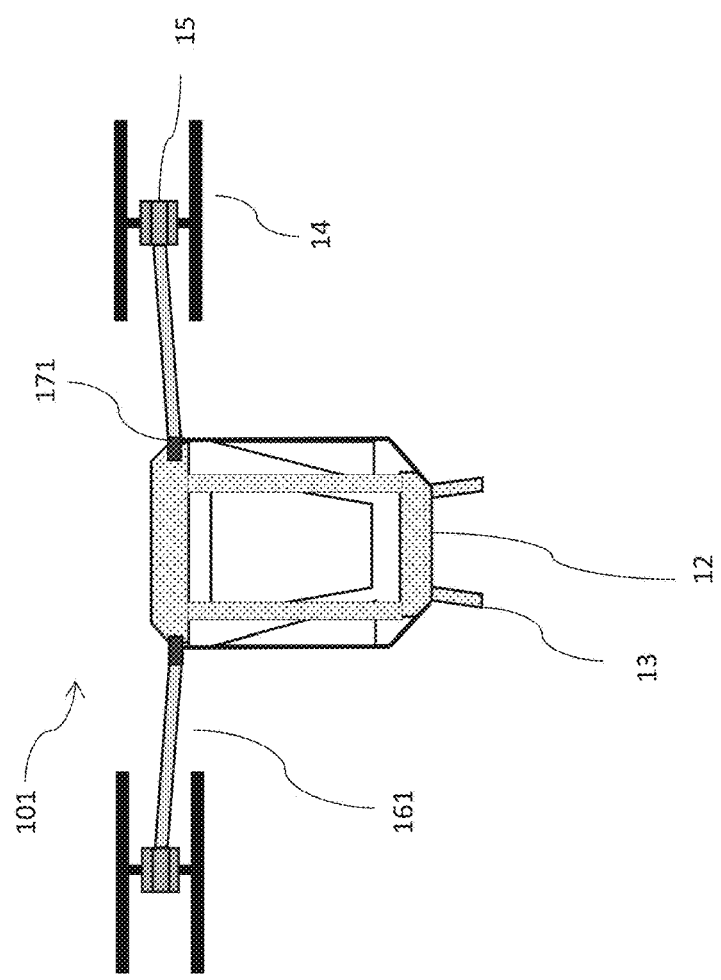
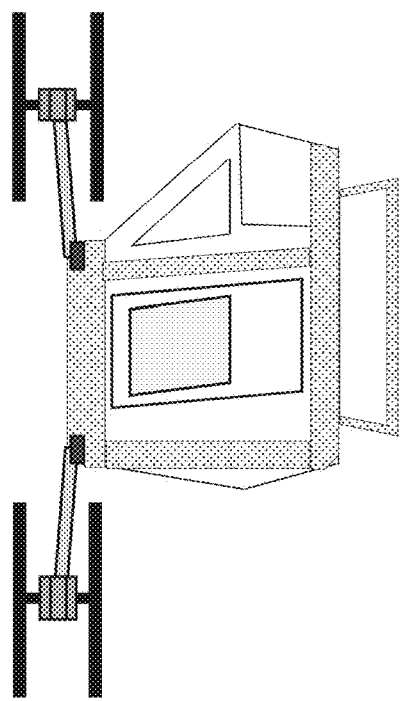
FIG. 2b
FIG. 2a

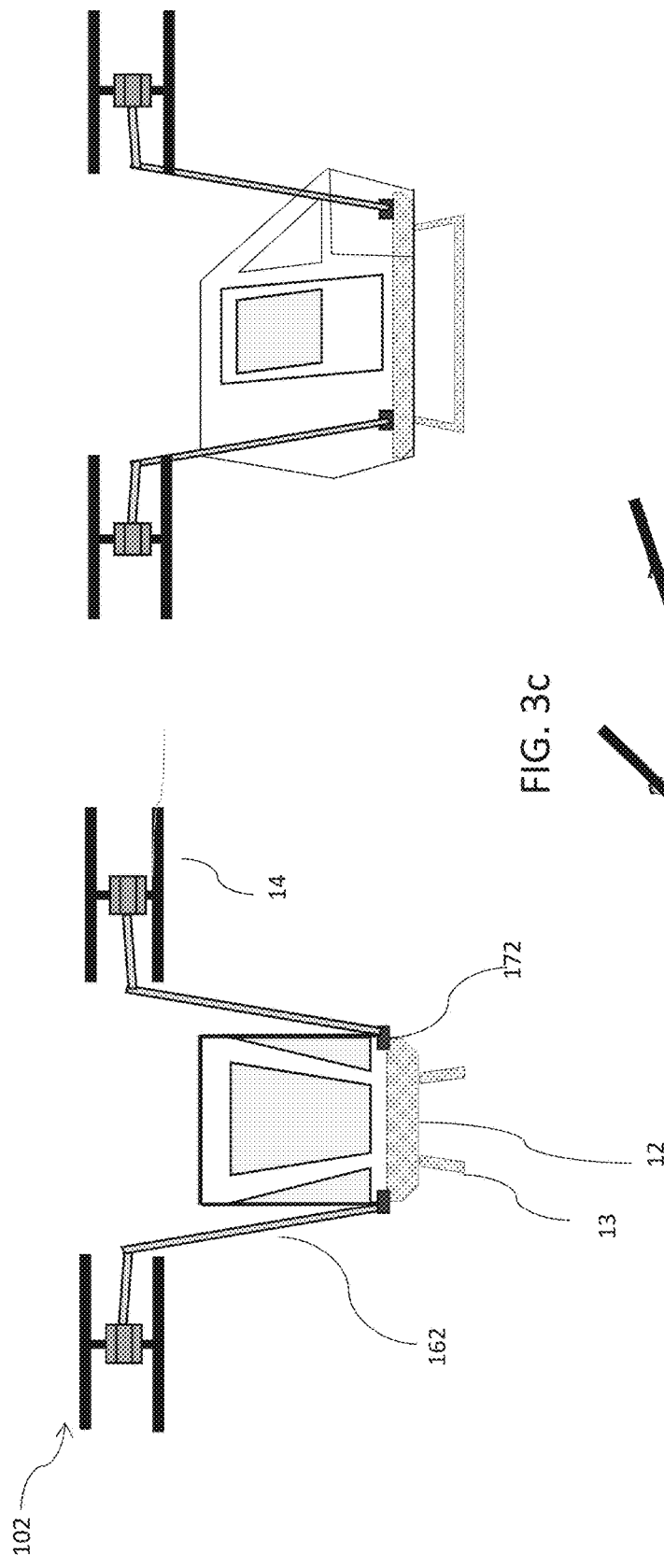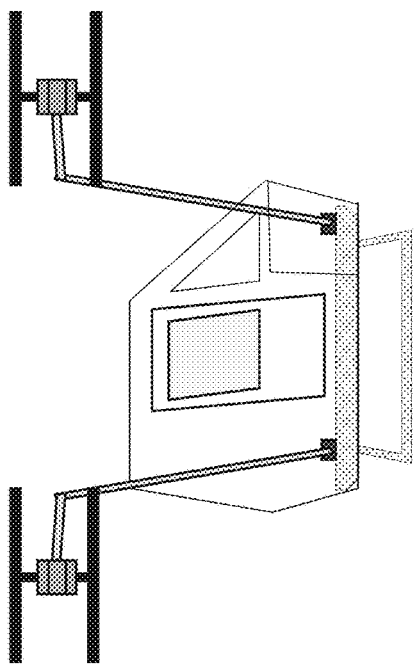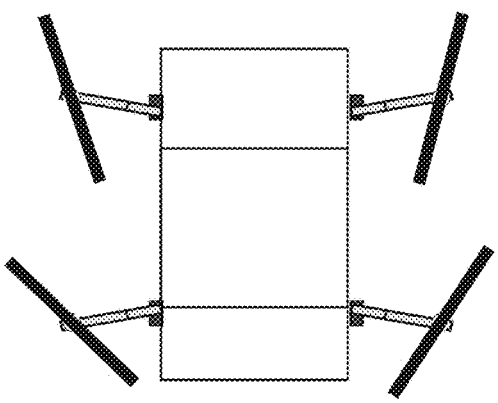

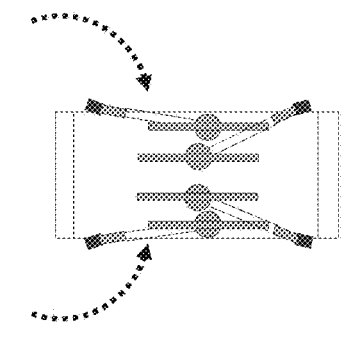
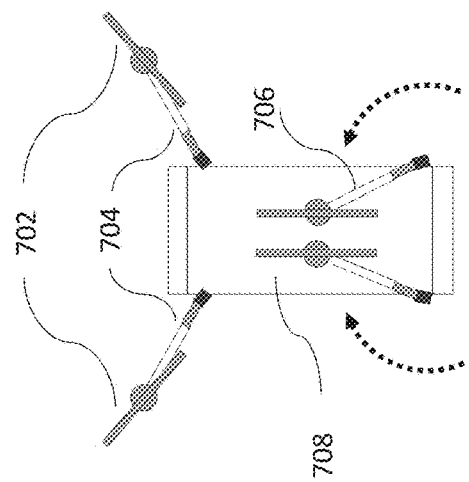
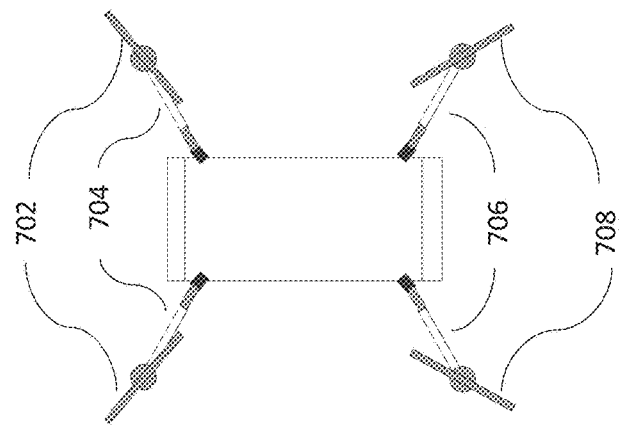
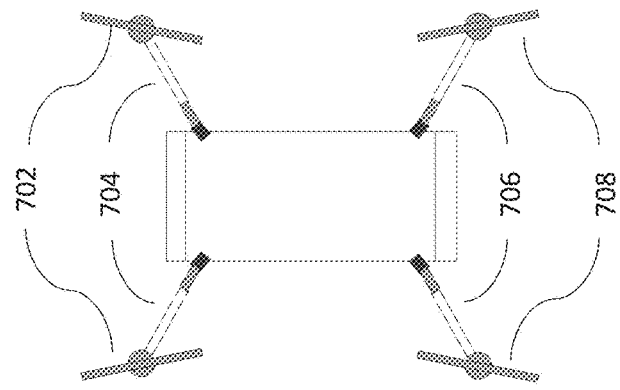

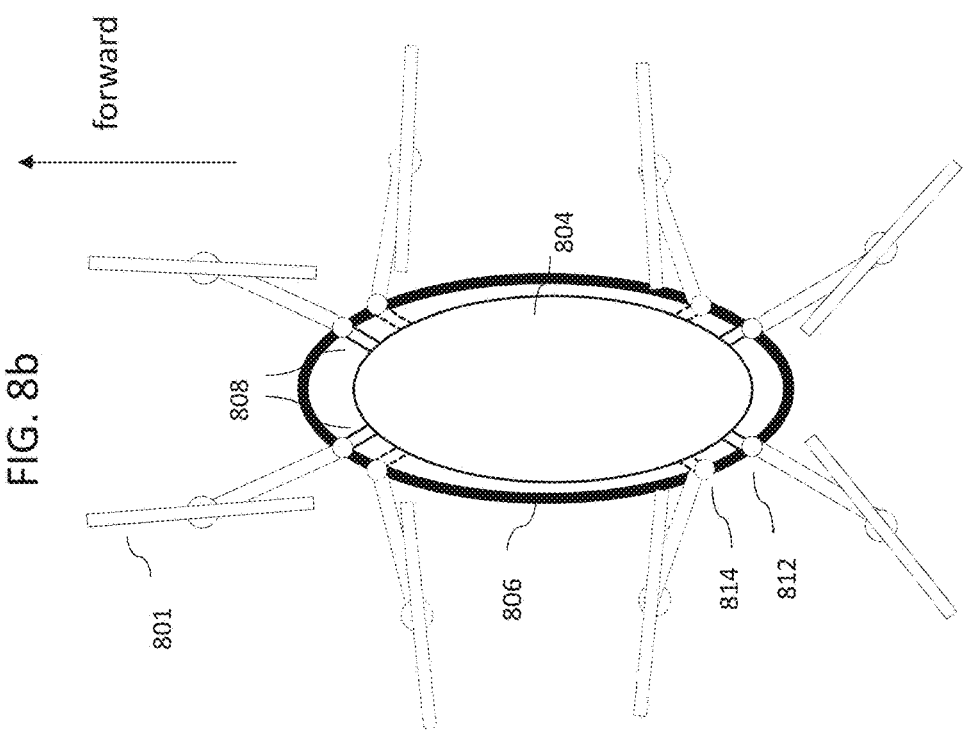
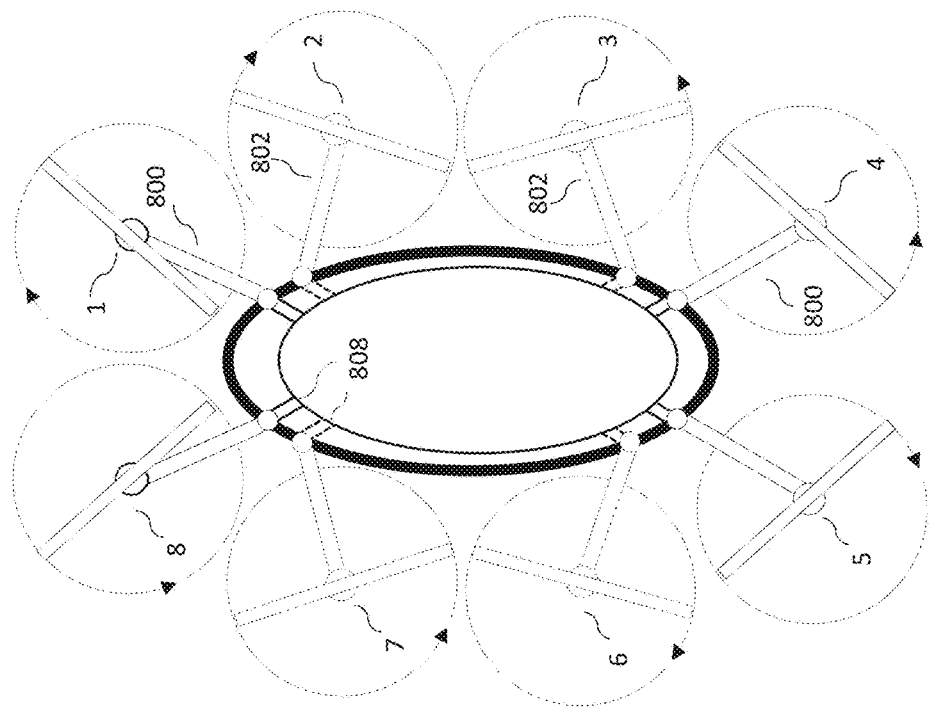

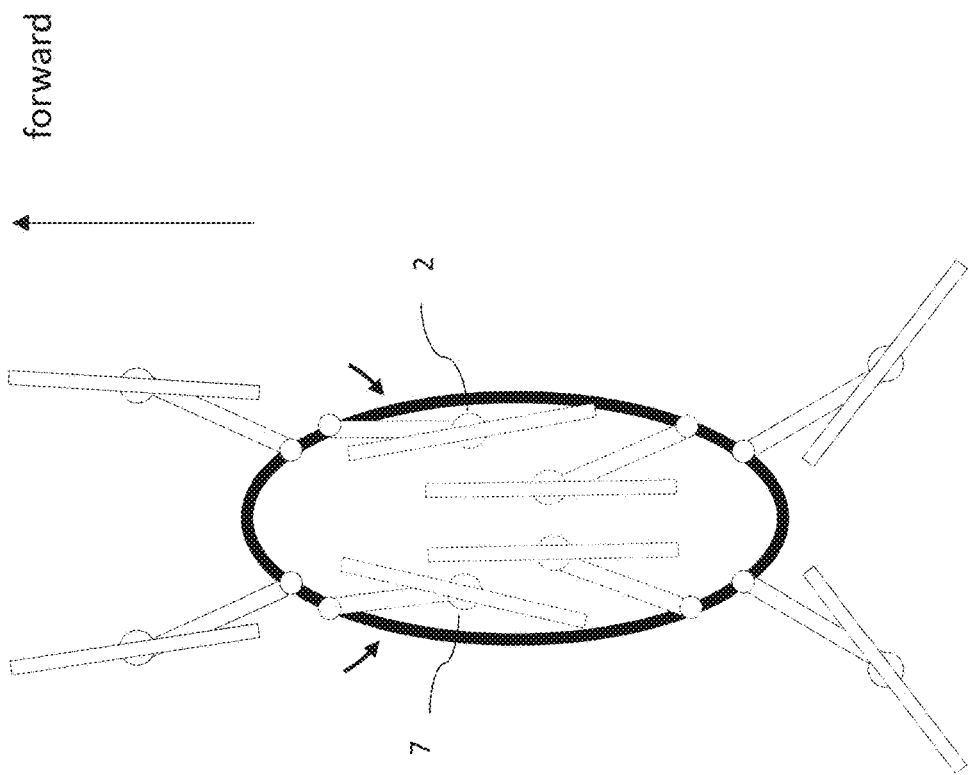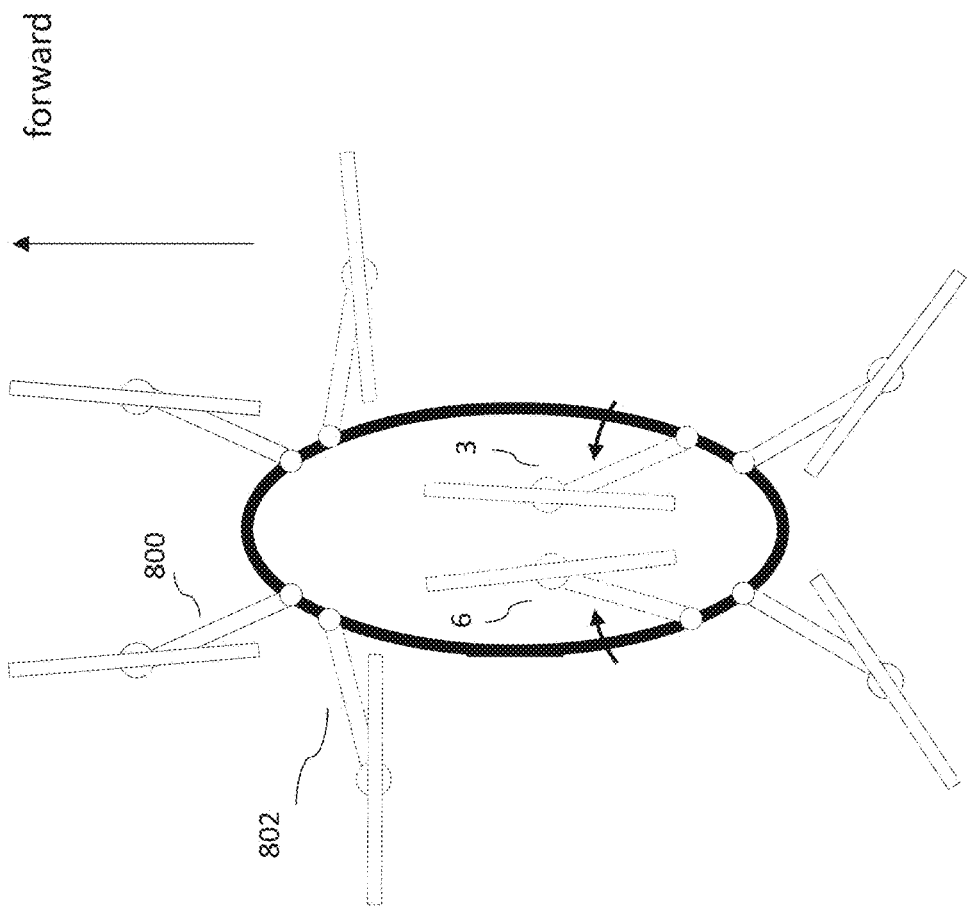

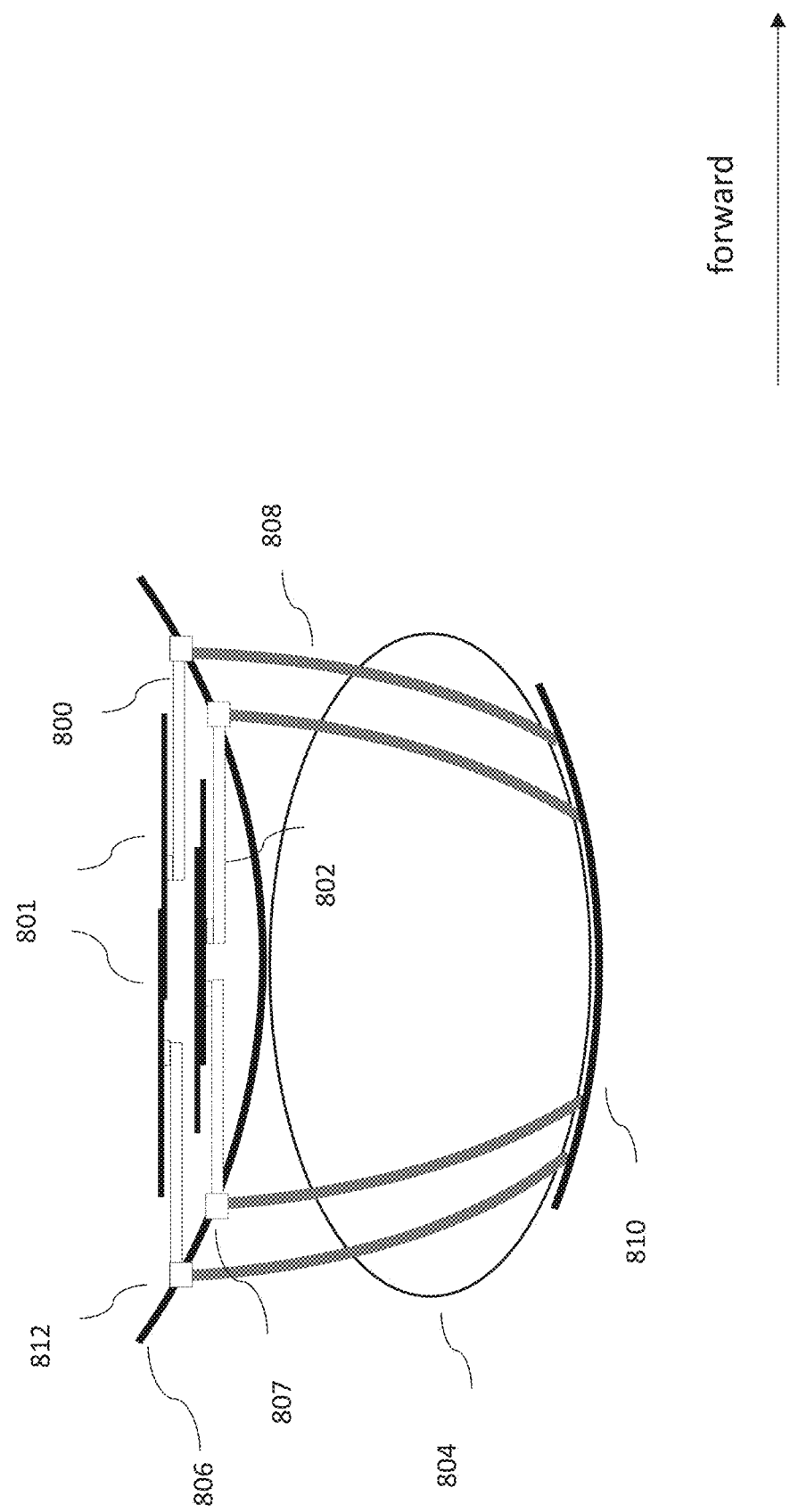

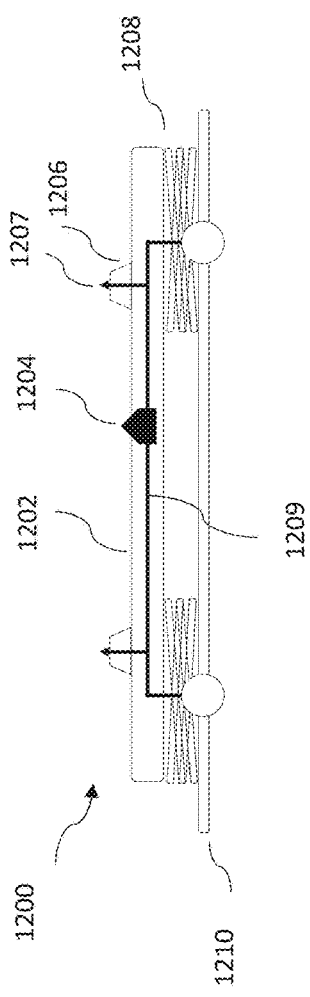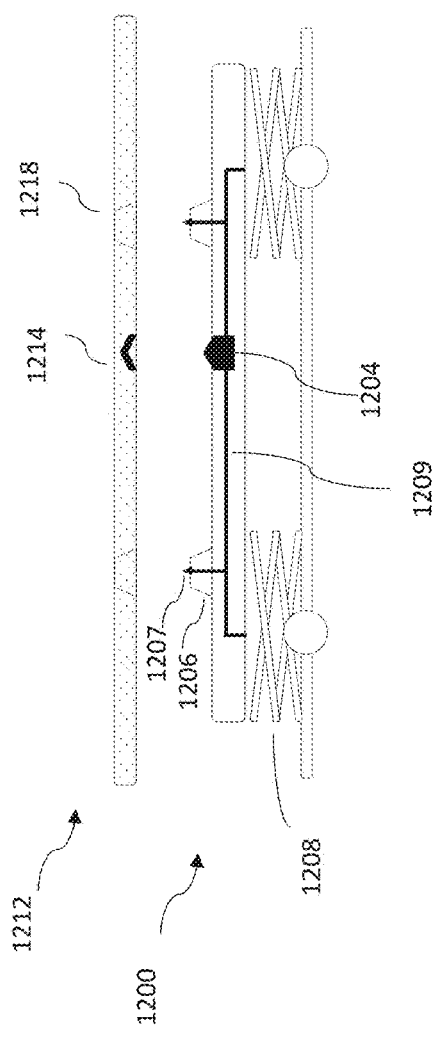

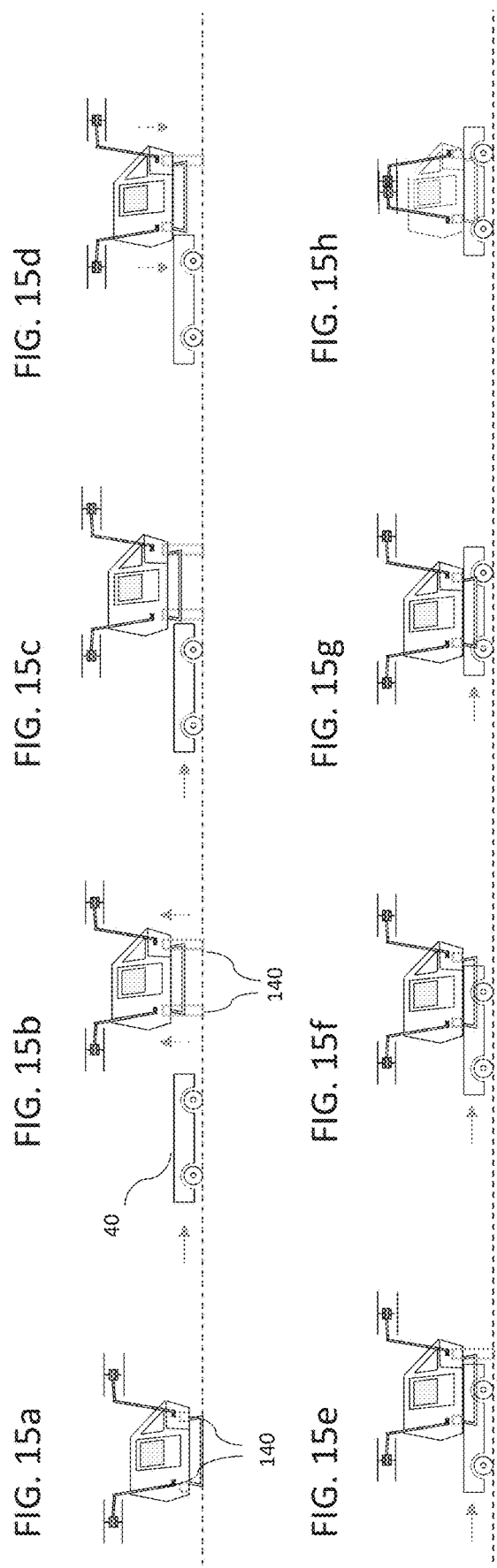

AERIAL TRANSPORTATION SYSTEM

FIELD AND BACKGROUND OF THE INVENTION

The present invention relates to aerial vehicles and, in particular, concerns an aerial vehicle which assumes a compact configuration when not in flight, and corresponding methods of operation of a passenger terminal for such vehicles.

In view of heavy traffic congestion in many urban areas, a major effort is being conducted worldwide to develop solutions that will enable by-passing the ground traffic congestions. In many cases these solutions are based on air vehicles with Vertical Take-Off and Landing (VTOL) capabilities, mostly with electric motors with electronic control. Several companies are involved in this effort, for example Uber, Ehang, Volocopter, Lilium, and Airbus.

The overall footprint of the commercially available aerial vehicles capable of transporting passengers is typically large per passenger, which hampers implementation of such technology as a commercially-relevant mode of mass passenger transport, particularly in the context of the space limitations of a crowded urban environment where the technology is most needed.

SUMMARY OF THE INVENTION

The present invention is an aerial vehicle which assumes a compact configuration when not in flight, and corresponding methods of operation of a passenger terminal for such vehicles.

According to the teachings of an embodiment of the present invention there is provided, an aerial vehicle comprising: (a) a passenger cabin for receiving at least one passenger; and (b) a propulsion system comprising a plurality of propulsion units each having an effective thrust tunnel, the propulsion system being configured to propel the aerial vehicle for powered flight, the propulsion system further being configured to perform vertical take-off and landing (VTOL), wherein each of the propulsion units is mounted relative to the passenger cabin via a displacement mechanism so as to be deployable between a flying position and a stowed position, and wherein, when the propulsion units assume the flying position, the effective thrust tunnels of the propulsion units are mutually non-intersecting, and when the propulsion units assume the stowed position, each of the effective thrust tunnels intersects another of the effective thrust tunnels and at least part of each of the propulsion units is located above the cabin with the effective thrust tunnels overlapping the cabin.

According to a further feature of an embodiment of the present invention, deployment of the propulsion units between the flying position and the stowed position is effected by rotation about a substantially vertical axis of at least part of an arm supporting the propulsion unit.

According to a further feature of an embodiment of the present invention, each of the propulsion units comprises at least one rotor, and wherein, in the stowed positions, each of the rotors assumes a predefined angular position relative to the arms.

According to a further feature of an embodiment of the present invention, each of the rotors has a direction of elongation, and wherein the directions of elongation are substantially parallel in the stowed positions.

According to a further feature of an embodiment of the present invention, the directions of elongation are aligned in a front-back direction relative to the cabin in the stowed positions.

According to a further feature of an embodiment of the present invention, there is also provided a load-bearing structure beneath the cabin, and wherein the arm supporting each of the propulsion units is attached to the load-bearing structure and supports the propulsion unit in the flying position at a level above the cabin.

According to a further feature of an embodiment of the present invention, the cabin comprises at least one passenger access door, and wherein deployment of the propulsion units to the stowed positions does not obstruct access to the passenger access door.

According to a further feature of an embodiment of the present invention, a system comprising: (a) the aforementioned aerial vehicle; and (b) a wheeled platform configured for receiving the aerial vehicle for conveying the aerial vehicle between areas of a passenger terminal.

According to a further feature of an embodiment of the present invention, the aerial vehicle and the wheeled platform are configured to allow the wheeled platform to enter beneath the aerial vehicle after the aerial vehicle has landed on a surface and then engage the aerial vehicle.

There is also provided according to the teachings of an embodiment of the present invention, an aerial vehicle comprising: (a) a passenger cabin for receiving at least one passenger; (b) a load-bearing structure beneath the cabin; and (c) a propulsion system comprising a plurality of propulsion units, the propulsion system being configured to propel the aerial vehicle for powered flight and to perform vertical take-off and landing (VTOL), wherein each of the propulsion units is carried by a support arm attached to the load-bearing structure, the support arm extending upwards so as to support the propulsion unit at a level above the cabin.

According to a further feature of an embodiment of the present invention, at least part of a plurality of the arms is displaceable so as to selectively deploy corresponding ones of the propulsion units between a flying position deployed for flight and a stowed position at least partially overlapping the cabin.

According to a further feature of an embodiment of the present invention, deployment of the propulsion units between the flying position and the stowed position is effected by rotation of at least part of the plurality of the arms about a substantially vertical axis.

According to a further feature of an embodiment of the present invention, the cabin comprises at least one passenger access door, and wherein deployment of the propulsion units to the stowed positions does not obstruct access to the passenger access door.

There is also provided according to the teachings of an embodiment of the present invention, a method for operating a passenger terminal for aerial vehicles, the method comprising the steps of: (a) providing a plurality of aerial vehicles each comprising: (i) a passenger cabin for receiving at least one passenger, and (ii) a propulsion system comprising a plurality of propulsion units, the propulsion system being configured to propel the aerial vehicle for powered flight and to perform vertical take-off and landing (VTOL), each of the aerial vehicles being reconfigurable between a flight configuration having a first footprint size and a compact configuration having a reduced footprint size; (b) providing a passenger terminal including a landing area for the aerial vehicle to land, a takeoff area for the aerial vehicle to take off and disembarkation/embarkation areas for passengers to exit and enter the aerial vehicles; (c) reconfiguring the aerial vehicle to its compact configuration; (d) employing a wheeled platform to convey the aerial vehicle from the landing area to the disembarkation area; and (e) allowing at least one passenger to disembark from the aerial vehicle.

According to a further feature of an embodiment of the present invention, the cabin comprises at least one passenger access door, and wherein the at least one passenger access door is unobstructed so that the at least one passenger can disembark from the aerial vehicle when the aerial vehicle is in the compact configuration.

According to a further feature of an embodiment of the present invention, the aerial vehicle and the wheeled platform are configured to allow the wheeled platform to enter beneath the aerial vehicle after the aerial vehicle has landed at the landing area and then engage the aerial vehicle.

According to a further feature of an embodiment of the present invention, there is also provided a step of conveying the aerial vehicle from the disembarkation area to a maintenance area while in the compact configuration.

According to a further feature of an embodiment of the present invention, there are also provided the steps of: (a) conveying the aerial vehicle to an embarkation area for embarkation of at least one passenger; (b) conveying the aerial vehicle from the embarkation area to a take-off area; and (c) reconfiguring the aerial vehicle to its flight configuration for take-off of the aerial vehicle.

According to a further feature of an embodiment of the present invention, there is also provided a step of separating the wheeled platform from the aerial vehicle before take-off of the aerial vehicle.

According to a further feature of an embodiment of the present invention, the reconfiguration of the aerial vehicle comprises displacement of a plurality of the propulsion units relative to the cabin.

According to a further feature of an embodiment of the present invention, the reconfiguration of the aerial vehicle from the flight configuration to the compact configuration comprises removal of at least one component from the aerial vehicle for storage at the passenger terminal, and wherein the reconfiguration of the aerial vehicle from the compact configuration to the flight configuration comprises attachment of at least one component to the aerial vehicle.

According to a further feature of an embodiment of the present invention, the reconfiguration of the aerial vehicle is performed at least in part by one or more robots.

BRIEF DESCRIPTION OF THE DRAWINGS

The invention is herein described, by way of example only, with reference to the accompanying drawings, wherein:

FIGS. 2a and 2b are schematic back and side views of a first prior art design AV with upper-cabin mounted propulsion units, respectively;

FIGS. 3a-3c are schematic front, side and top views (respectively) of the AV according to an embodiment of the present invention;

FIGS. 7a-7d are schematic top views of the AV of FIG. 3a illustrating a sequence of positions during folding of a propulsion system, including aligning rotors at predetermined angles relative to arms, and sequenced folding of the arms;

FIGS. 8a-8f are schematic top views of an AV according to a further embodiment of the invention, illustrating a sequence of positions during folding of a propulsion system, including aligning rotors at predetermined angles relative to arms, and sequenced folding of the arms;

FIG. 8g is a schematic isometric view of the AV of FIG. 8a;

FIGS. 12a-12e are schematic views of a dolly coupled with a swappable battery and an AV;

FIGS. 15a-15h are schematic side views showing a sequence of states during a horizontal docking process of the AV of FIG. 14a with a SGV according to the embodiment of FIG. 14a.

DESCRIPTION OF THE PREFERRED EMBODIMENTS

Introduction and Overview

The present invention is an air transportation system, which may be implemented in a number of different configurations and which may be extended for various degrees of ground transportation.

The invention teaches an air vehicle, preferably a multi-rotor helicopter (or "multicopter") of a novel structural concept referred to as the sub-super design in which the propulsive units (motors and propellers) operating above cabin roof level are supported by arms connected to the bottom part of the air vehicle. In footprint-sensitive conditions; the propulsive units may be automatically stowable/deployable.

The principles and operation of transportation systems and corresponding methods according to the present invention may be better understood with reference to the drawings and the accompanying description.

By way of introduction, the present invention relates to a number of different implementations which provide a passenger-carrying aerial vehicle (to be hereinafter referred to as AV) configured to operate as part of an integrated ground-and-air transport infrastructure, allowing critical portions of a route to be completed by air transport in a manner suitable for accommodating large numbers of travelers.

As a matter of definition, a multicopter is a helicopter with lift forces being provided by multiple rotors, each driven by a separate motor with electronic control, such as depicted for example in FIGS. 3a-3c. Each rotor coupled with the motor driving it is referred to as propulsive unit (although, for the purpose of certain geometrical definitions of the overlap or non-overlap of thrust tunnels of the propulsive unit, only non-coaxial rotors may be considered distinct propulsive units, as detailed further below). Throughout the invention, the terms "multicopter" and "AV" are used interchangeably unless otherwise specified.

A multicopter featuring at least 8 rotors may be more reliable than a helicopter with one main rotor and in case of electric or hybrid design would feature several smaller motors rather than one large motor.

Figure 10A:
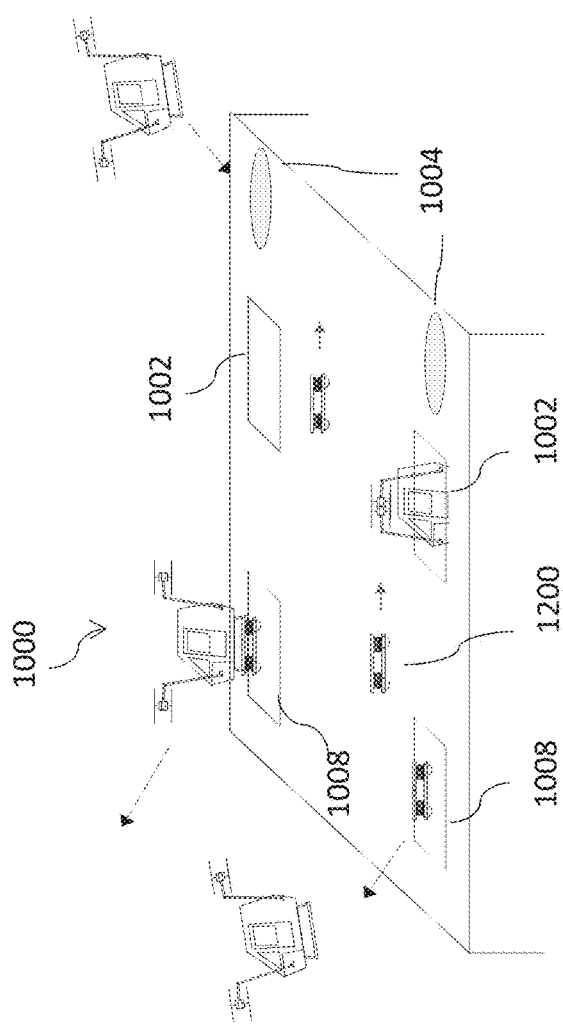
FIGS. 10a and 10b are schematic isometric and vertical cross-sectional views, respectively, of a second implementation of a Rooftop Terminal according to the teachings of a further aspect of the present invention.
Figure 10B:
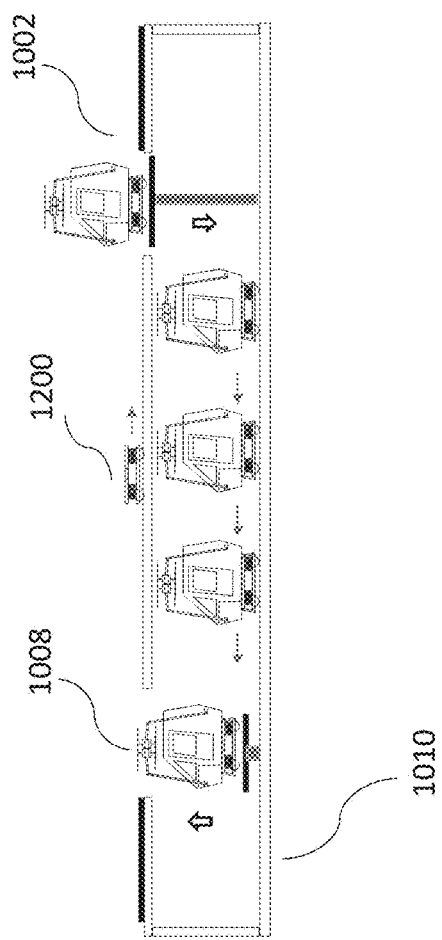

The AV operates from dedicated transportation stations enabling vertical take-off and landing, commonly referred to as Vertiports, such as depicted for example in FIGS. 10a-10b. In many cases, in particular in urban areas, there are limitations on the size of the Vertiports, stemming from real estate scarcity. Such limitations influence the Vertiport design as well as the AV design and may greatly benefit of AV designs with stowable propulsive units handled by heaving robots or other handling arrangement, typically based on robotic wheeled platforms.

Take-off and landing of the multicopter necessitates a landing pad with minimum dimensions determined by the size of the vertical projection of the multicopter at landing (or "flight configuration footprint") and the touch-down accuracy as determined by the characteristics of control at landing. One or several landing pads may exist on an air-field (which in certain cases may be also referred to as flight deck). The air-field must be a restricted area, in which pedestrian or vehicular access is prohibited unless specifically coordinated and accidental animal access is prevented in order to avoid harm or injury to any of them as well as to the multicopter and its occupants. From the landing pad the multicopter is moved (or "taxied") by a dedicated auxiliary device (to be referred to as handling robot or in particular cases as heaving robot or dolly) which is attached (or docked) to it, onto the flight terminal (to be hereinafter referred to as "terminal") at which the passenger egress (or disembarkation) from the multicopter takes place at the arrivals gate. Thus the terminal makes the multicopter accessible to the passengers. In certain cases, depending on the capabilities of the dolly and the type of terrain, the multicopter with its occupants may be moved to locations at different distances (typically "last mile") from the air-field perimeter.

Adjacent to the terminal and in fact as a part of it, there is an area allocated for energy provisioning (such as batteries charging) and multicopter queueing. Throughout this area the multicopter that has been previously vacated of passengers is handled by the dolly, which is preferably attached underneath it. The footprint of the multicopter has a direct impact on the land area required for the terminal including the adjacent charging and queuing area. Land area (including rooftop area), which is a very precious resource in urban areas, is therefore the limiting factor on the number of multicopters that can be handled at a terminal, which directly affects the traffic throughput that the terminal can support. Therefore, in order to maximize traffic throughput, there is a desire to minimize multicopter footprint, but there remains the contradicting requirement for a large flight configuration footprint resulting from the rotor disks area necessary for providing the required lift force. The inventive way to resolve such contradiction is by dramatically reducing the multicopter footprint when on ground ("ground configuration footprint") by stowing (preferably folding) the propulsive units and their supporting arms. The stowing preferably, although not necessarily, occurs "automatically" in the sense that it does not require the passenger(s) or any other human operator to be present outside the vehicle in order to effect the stowing process, thereby allowing the landing area to be free from human operators and passengers. Most preferably, the passengers remain within the AV during the stowing and handling of the AV until the AV reaches a designated disembarking station, where they leave directly from the AV into a terminal, as discussed further below. In certain implementations, automatic stowing may be a key enabler for seamless transition in a short time period from air travel to ground travel. Stowing of the propulsive units may remove a further concern, namely keeping the total width of the vehicle to dimensions that are acceptable for travel on ground roads to various distances as compatible with the travel capabilities of the dolly carrying the multicopter as well as structural and safety limitations applicable for ground travel. Dimensional requirements for ground vehicles to be roadable are detailed for example by the European Union at the website:

https://ec.europa.eu/transport/modes/road/weights-and-dimensions_en

As a matter of definition and differentiation, the term "stowing" within the current invention is limited to operational stowing of the propulsive units, as performed during the normal functional cycle of the AV at the vertiport, from landing throughout ground travel with passengers in the cabin, disembarkation, recharging, embarkation and approaching to takeoff. As the stowing process is a part of the functional cycle of the vertiport, it is time-sensitive (preferably completed within tens of seconds) and is preferably performed without requiring the involvement of a human operator. In certain particularly preferred implementations, the stowing process is performed automatically using dedicated actuating systems integrated in the AV, as well as various locking and securing devices, activated in predefined sequence and logic, and controlled by a control system operated by the ground handling robot, with all the stowing/deploying processes being performed on ground.

It is to be noted that this type of stowing is totally different than stowing or disassembly for logistical needs, such as transportation on trailers or trucks for purposes such as maintenance, storage or relocation, as taught for example in US Patent Application 20190176956 and in U.S. Pat. No. 9,663,237. This logistical stowing must be performed by qualified personnel and is not a part of the normal functional cycle of the AV at the vertiport.

It is to be understood that all reference in the above sections to "stowing" is equally relevant to the inverse action, namely "deploying".

The multicopter includes a passenger cabin accommodating at least one passenger, a plurality of propulsive units (for example, rotors and motors coupled to them), flight systems such as guidance, navigation and control, flight data displays, communication systems, actuators for stowing and deployment of the propulsive units, a power supply, such as batteries, fuel cells, hydrogen or hybrid systems, a multicopter structure supporting and connecting the various elements and subsystems of the multicopter, including landing elements such as skids or legs. Except as further specified below, features of the propulsive units, the flight systems and many other features of the multicopter are closely analogous to known and commercially available subsystems of existing multicopters, and will be fully understood by a person having ordinary skill in the art. For conciseness of presentation, in the subsequent description, the multicopter will be presented in a schematic manner, with emphasis only on those features which distinguish the multicopter of the present invention from the known art, and omitting explicit description of various conventional features and components.

The propulsion system is configured to propel the aerial multicopter for powered flight including vertical take-off and landing (VTOL). The propulsive units may be structurally supported by arms which are connected to the main multicopter structure. As it will be subsequently explained, the way in which the multiple propulsive units are configured has a direct influence on the performance, weight, structure and overall design of the multicopter. In case that the propulsive arms are stowable, such connections are preferably by pivot joints (such as hinges) and/or by sliding. Each arm may support one or more propulsive units Although for a given number of propulsive units, a design with just one propulsive unit per arm necessitates a larger number of stowing actuators than in the case of arms supporting multiple rotors, the advantage of such design is that it features a lower moment of inertia around the folding hinge and thereby relieves the requirements on the stowing actuators. Therefore, such a design is adopted in some of the preferred embodiments of the invention. Another configuration of certain preferred implementations is an arrangement with a pair of independently-driven propulsive units supported coaxially by each arm, typically operated as a single effective propulsive unit while providing redundancy for added safety in the event of a component failure.

For flight, take-off/landing and ground safety reasons, it is preferred that the rotors be located above the cabin roof level, both in the stowed and in the deployed condition. Folding and unfolding of the arms, and more importantly rotation of the rotors, are all performed clear of the ground (preferably above 2 m). This clearance is important since those movements do not endanger personnel that might inadvertently approach the multicopter.

In order to facilitate stowing, unshrouded rotors are preferable and the number of blades per rotor is preferably limited to two. In order to enable compact stowing, the blades need to be positioned at predefined angles relative to the supportive arms and the stowing of the various arms has to be conducted in a predefined sequence.

According to a first preferred design of a multicopter, the AV cabin typically has at least one passenger access door. The stowed positions of the propulsive units are preferably configured so that they do not obstruct access to the passenger access door(s), allowing stowing of the propulsion units before the passenger boards and/or alights from the vehicle.

It should be noted that, for clarity of presentation herein, details of the aerial vehicle controller and various other components of the AV are not shown here in detail. In each embodiment of the present invention, the AV is preferably provided with various sensors (GPS receivers, image sensors, range sensors, orientation and motion sensors), processors, communications systems and all other components commonly used to implement autonomous drones with autonomous navigation capabilities using GPS and/or optical tracking, collision avoidance and automated take-off and landing. All such components, subsystems and modes of operation are well-known in the art of manufacture of air vehicles, and will be readily understood by one having ordinary skill in the art.

FIGS. 1a-1e describe an exemplary AV 10 with a propulsive assembly including eight rotors 14 driven by eight motors 15 which are supported by four motor supportive arms 16 hinged to arm ports 17 which are structurally integrated to body main structure 12 which is supported on the ground by skids 13. It should be noted that many other designs are possible, including a design with a single rotor at each arm as well as options employing more than four arms, each of them supporting at least one propulsive unit including a rotor coupled to a driving motor. Typically, the AV may carry one or two passengers. The AV take-off/landing may be done using an originally ground-dedicated take-off/landing system based on "legs" such as skids, legs or other landing gears attached to the fuselage of the AV.

Figure 1B:
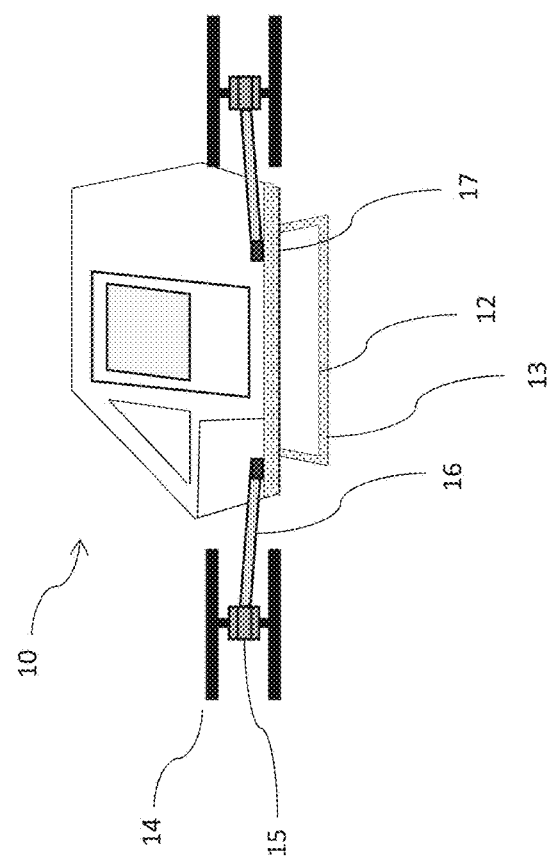
FIGS. 1a-1c are schematic front, side and bottom views (respectively) of a prior art aerial vehicle (AV), of the sub-copter type.
Figure 1A:
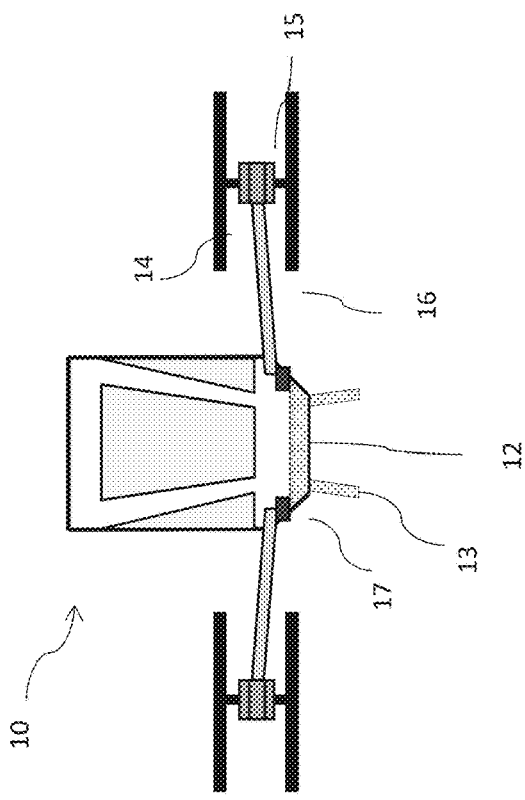
Figure 1C:
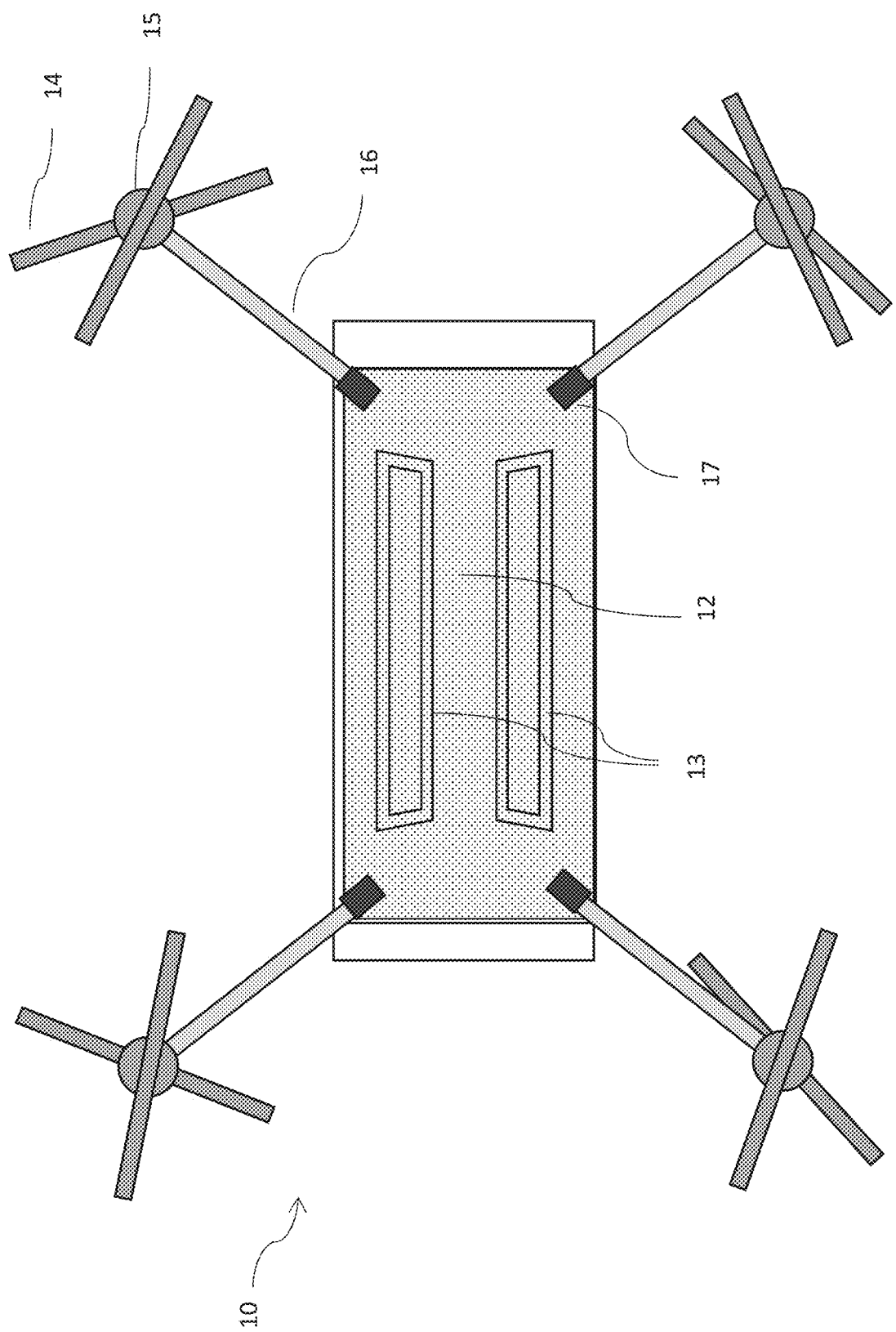

For the purpose of comparison, FIGS. 1a-1c illustrate a schematic prior-art design, of the type of the EHANG™ 184 model (www.ehang.com), where propulsive assemblies are supported by arms 16 which are connected to arm ports 17 at the lower part of the cabin (i.e. floor) and extending essentially horizontally. An AV of this design will be hereinafter referred to a sub-copter with horizontal arms or a "pure sub-copter". A pure sub-copter design has the favorable feature of the arms with the propulsive unit being attached to the most rigid part of the cabin.

One problematic attribute of the pure sub-copter design is the very small clearance between the rotors and the ground, which limits landing on uneven surfaces, such as in cases of an emergency landing at a non-authorized location, or in the presence of strong winds which may act to tilt the AV. Additionally, even at authorized landing locations, this low clearance poses a considerable hazard to whoever may be present in the vicinity of the AV before takeoff or after landing.

Figure 1E:
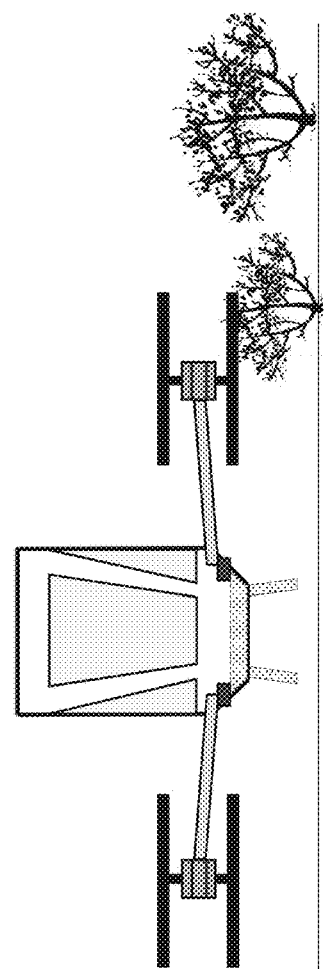
FIGS. 1d and 1e are schematic front views of an aerial vehicle of the sub-copter type, at possibly hazardous situations when landing in the presence of wind and in an open field, respectively.
Figure 1D:
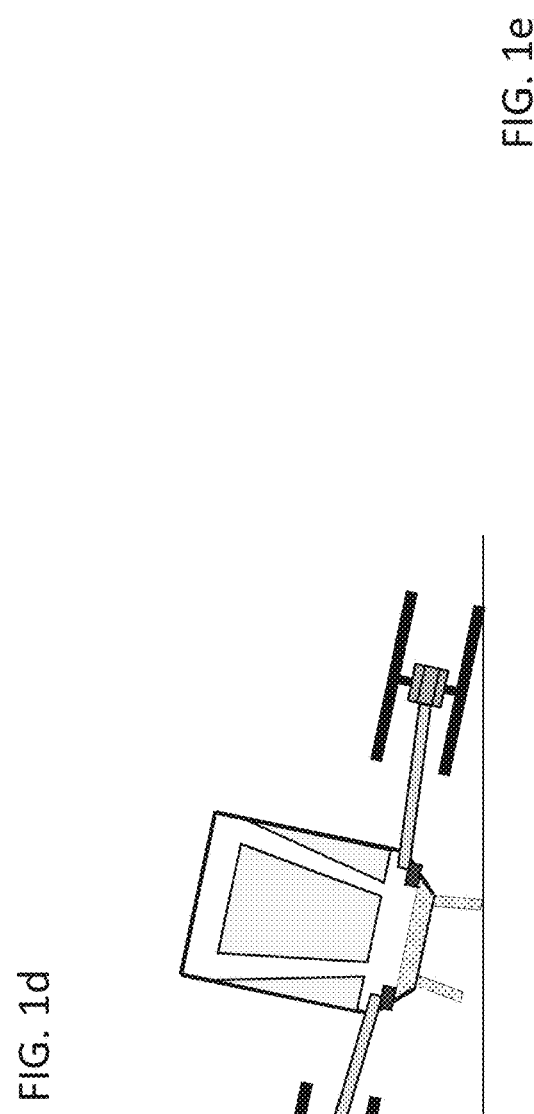

FIG. 1d illustrates a situation where the AV is landing in the presence of wind. Since landing is preferably performed at minimal lateral velocity relative to the ground, a fixed-rotor AV must tilt its whole body to the wind's direction to counter its effect. At this tilted position, due to the low position of the rotors, there is a danger of one or more of the rotors hitting the ground, with grave consequences to the AV and to its surroundings. FIG. 1e illustrates a situation where due to unexpected conditions, the AV is forced to perform an emergency landing in an open field with small shrubs or bushes. Here, too, there is a danger of one or more of the rotors hitting a small shrub or bush. The two examples demonstrate that an AV of the sub-copter type is limited to landing only in mild wind conditions, and only at flat, smooth and absolutely clear locations.

FIGS. 2a and 2b illustrate back and side views, respectively, of a first example of a super-copter AV. The propulsive units with the rotors rotating above cabin roof level are supported by arms 161 which are connected to arm ports 171 on the upper part of the cabin (e.g., the roof of the cabin). An AV of this design will be hereinafter referred to a "pure" super-copter configuration. A super-copter design benefits from considerably increased ground clearance of the rotors, but the passenger cabin must support the full load of the structure and must also support the moments present at the arm base. Therefore, a pure super-copter must be structurally stronger than in the case of a sub-copter design. This fact will typically result in a super-copter design being considerably heavier than sub-copter designs, with consequent limitations of power efficiency, range etc.

Figure 2D:
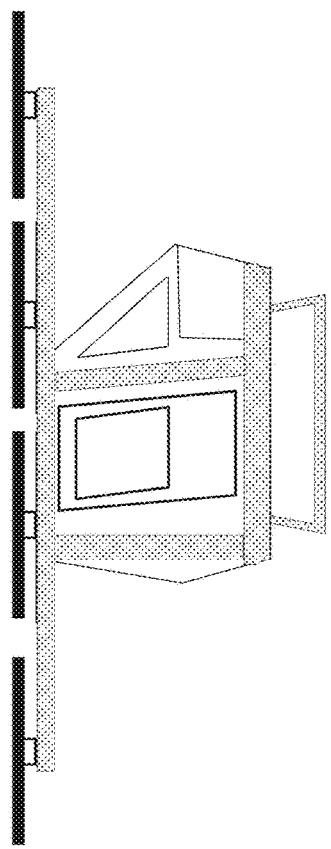
FIGS. 2c-2e are schematic back, side and top views of a second prior art design AV with upper-cabin mounted propulsion units, respectively.
Figure 2E:
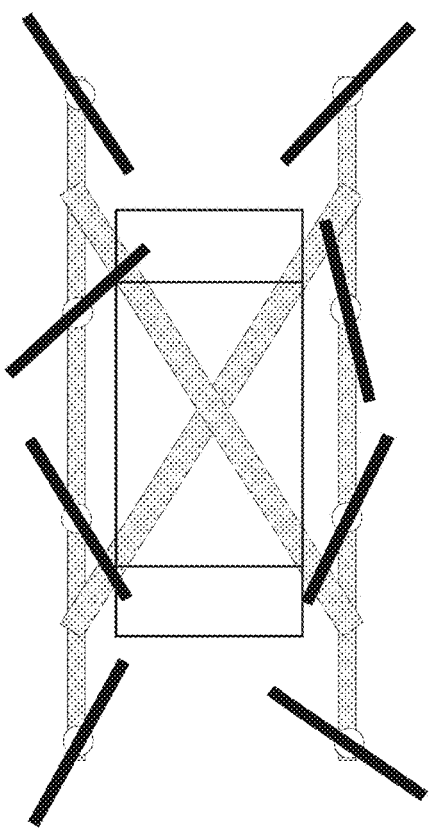
Figure 2C:
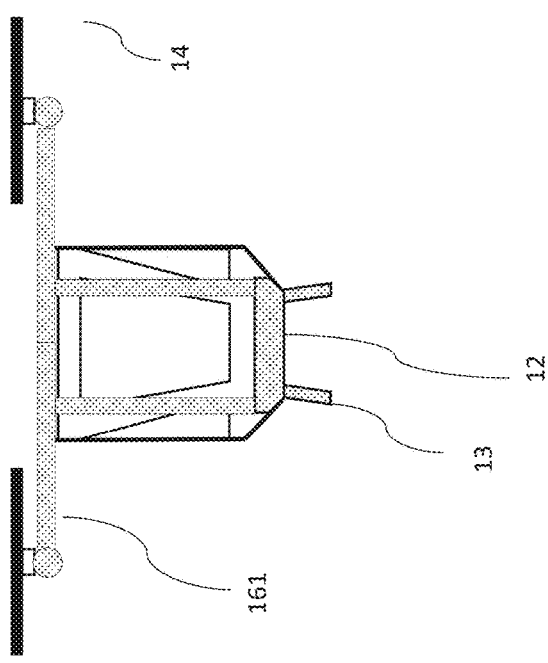

FIGS. 2c and 2d illustrate back, side and top views, respectively, of a second example of "pure" super-copter configuration. This type of configuration was introduced by the Swiss company Passenger Drone.

FIG. 3a-3c illustrate an AV configuration according to a first embodiment of the present invention with the propulsive units supported by arms 162 which are connected to arm ports 172 at the lower part of the cabin and extending upwards. According to such design, the rotor arms are connected to the lower part of the passenger cabin ("sub") and extend upwards so that the rotors rotate above the cabin roof level. An AV of this design will be hereinafter referred to a sub-super copter, sub-super AV, or a sub-copter with upwards extending arms. With such design, one has the structural advantages of the sub-copter but one can also maintain considerable clearance between the rotors and the ground, which is desirable from safety aspects.

A sub-super AV such as described at FIG. 3a enjoys a further substantial advantage relative to a pure super-copter such as described in FIG. 2a. In typical super-copter designs, the propulsive units including motors and rotors, as well as in many cases the battery and power-electronics are structurally integrated with a rigid cabin roof, which is vertically supported by the cabin. At cases of a rough or uncontrolled landing at a considerable vertical velocity, these heavy components together with the cabin roof might act as a hammer slamming down on the cabin and endangering the passengers (unless substantial supportive elements with extra weight are provided to the AV). Contrarily, in a sub-super AV such as described at FIG. 2b, the cabin roof is clear of any weight that might endanger the passengers in the event of a rough landing.

In a vertiport context, a sub-super AV enjoys a further substantial advantage over typical super-copter designs. Typically, subsequent to landing the AV must be removed from the landing pad to a pre-determined clearance distance to allow other AV's to takeoff or land. As the landing pads are typically a bottleneck of the vertiport operational cycle, the time for performing this action has a strong impact on vertiport efficiency and throughput. As can be seen in FIG. 4a-4d, a favorable solution for this action is using a dolly.

FIGS. 4a-4d schematically depict a heaving robot, which may also be referred to as handling robot or dolly, in a lowered state and a raised state, respectively, for use with certain embodiments of the present invention.

Figure 4A:
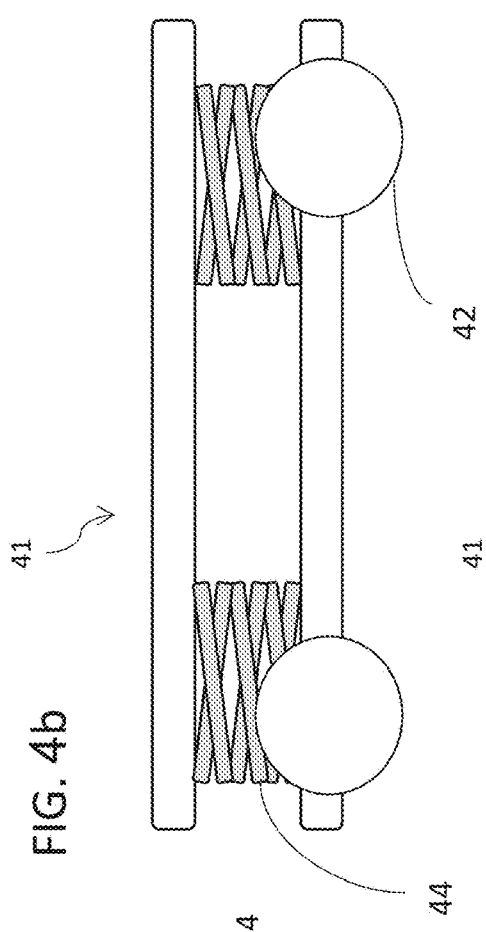
FIGS. 4a and 4b are schematic side views of a heaving robot shown in a lowered state and a raised state, respectively, for use with embodiments of the present invention.
Figure 4B:
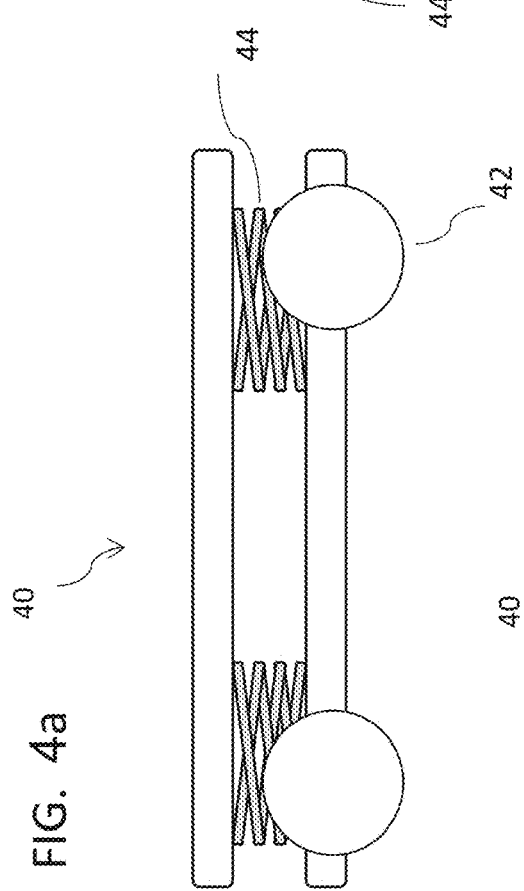
Figure 4C:
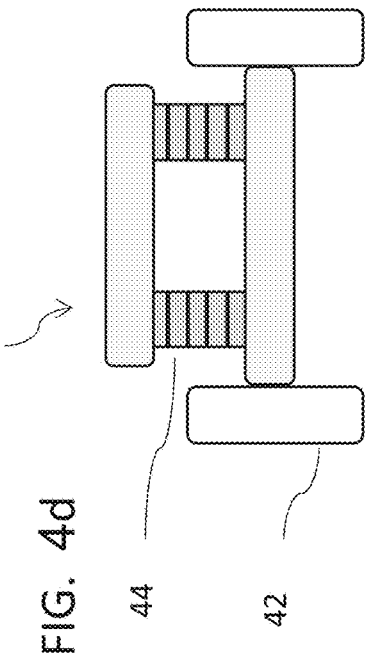
FIGS. 4c and 4d are schematic front views of a heaving robot shown in a lowered state and a raised state, respectively, for use with embodiments of the present invention.
Figure 4D:
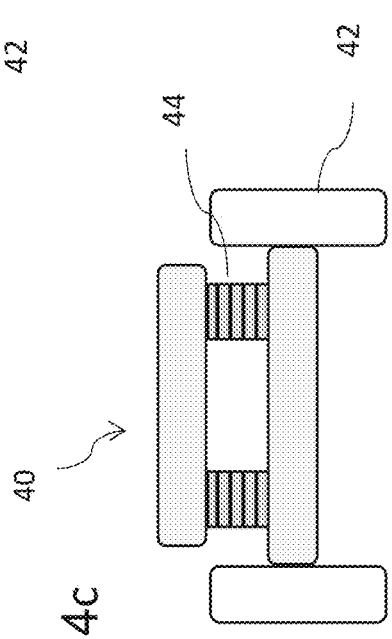

FIGS. 4a-4b illustrate a side view of a heaving robot, in a retracted (lowered) position 40 and an extended (raised) position 41, respectively. FIGS. 4c-4d illustrate a front view of a heaving robot, in retracted position 40 and extended position 41, respectively. The AV may be provided with attachment interfaces that will facilitate convenient engagement with heaving robots or other devices. The AV may be slowly moved on a generally flat surface from one location to another nearby location by heaving robots (which may be also referred to as handling robots). The heaving robots may preferably act on the AV main structural elements. A preferred approach is to support, engage, heave and move the AV by its structure (e.g. the root of the arms supporting the motors) using dedicated heaving robots 40 readily available at the AV landing site and engaging the AV after touch-down. The heaving robot is preferably equipped with at least one heaving actuator 44 which can be in an extended state (FIGS. 4b and 4d) or a retracted state (FIGS. 4a and 4c) in the vertical direction. As its name indicates, the heaving robot 40 is designed to heave and engage a load but in addition it is also able to move in a desired direction whether loaded or unloaded. These heaving robots can be accurately navigated (e.g. by optical positioning systems or by "marked terrain recognition" techniques) and can be accurately positioned and oriented below the points of the AV structure to be supported, engaged and heaved, of locations also exactly known by similar navigation techniques.

Alternatively, even if the position of the heaving robot or the AV on the ground is not known to a high level of accuracy, the heaving robots may autonomously position themselves below the AV and position their heaving actuators exactly below the heaving points of the AV, for example using image processing techniques. The heaving robot may have four independent wheels 52 each driven by its own electric motor or at least two wheels on the right side driven by one motor and at least two wheels on the left side driven by another motor and can thus move linearly along a desired direction which can be selected by controlling the wheels. The several heaving robots may be integrated into a single heaving robot that could move into a position between the skids and below the belly of the AV, heave the AV and take it to the desired position. Such a robot may be supported by extendable side arms with small wheels at their extremities.

Figure 5B:
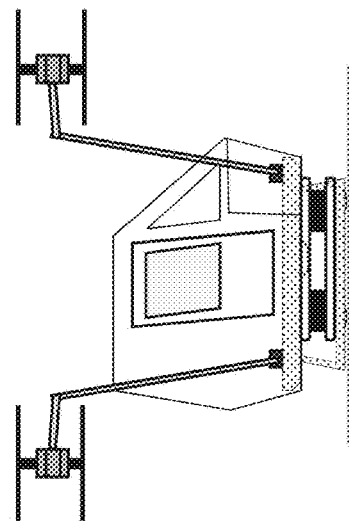
FIGS. 5a-5d are a sequence of schematic side views illustrating stages in the use of the heaving robot of FIG. 3a to move the AV of the present invention after landing.
Figure 5D:
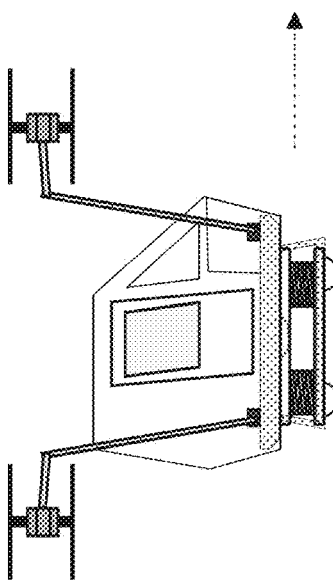
Figure 5A:
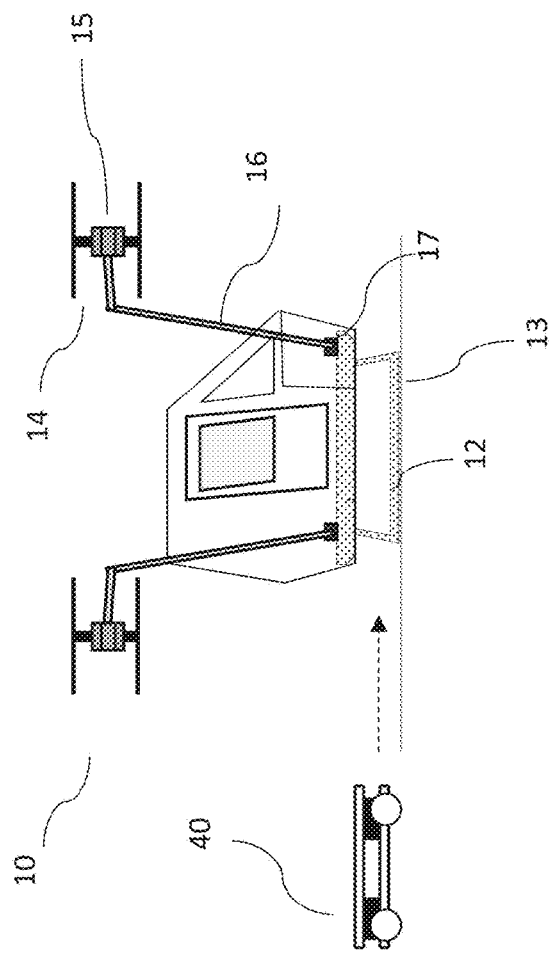
Figure 5C:
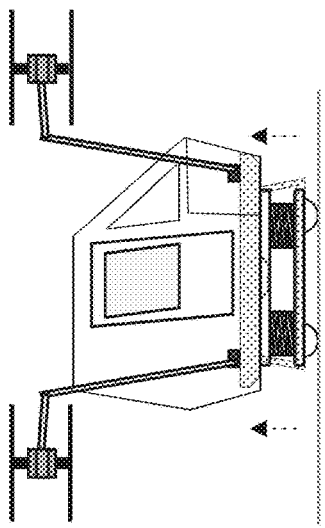
Figure 6A:
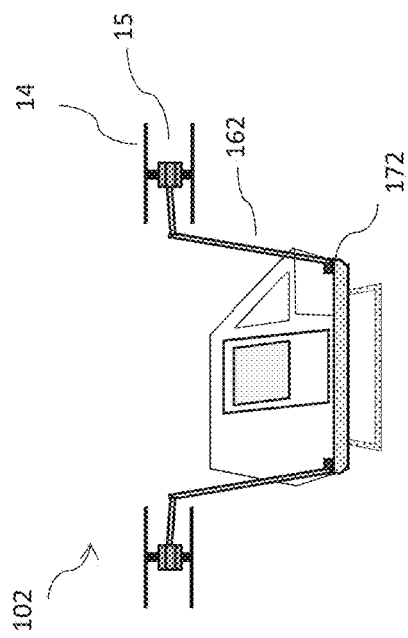
FIGS. 6a-6c are schematic front, top and side views of the AV according to a second aspect of the present invention, with propulsion units in a deployed position.
Figure 6B:
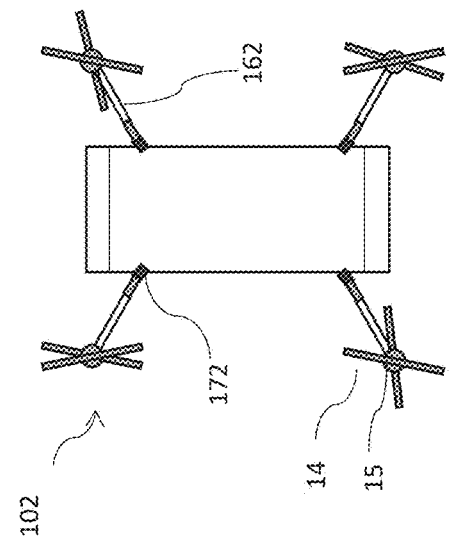
Figure 6C:
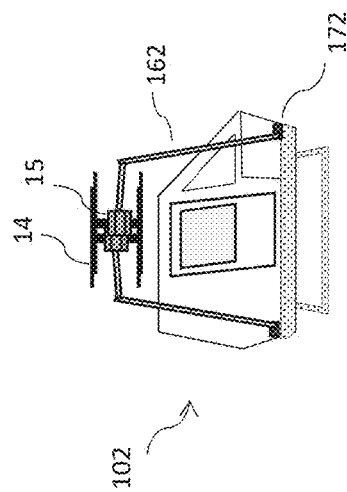

FIGS. 6a-6d schematically depict a sequence of stages in the use of the heaving robot of FIGS. 4a-4d to move the AV of the present invention after landing;

FIGS. 5a-5d illustrate the process of moving an AV using a heaving robot. FIG. 5a illustrates the heaving robot in retracted position 40 approaching the AV 10. FIG. 5b illustrates the heaving robot still in retracted position 40, placing itself between AV skids 13 and supporting AV belly 12. FIG. 6c illustrates the heaving robot in extended position 51 thereby lifting AV 10. FIG. 5d illustrates the heaving robot in extended position 41 conducting land travel with the AV 10 on top. In order to facilitate moving the AV on the ground, the heaving robots heave the AV structure in order to raise the skids from the ground. Moving the AV engaged with the heaving robots on the ground should be performed at a slow pace in order to minimize inertial loads. In the above context, using heaving robots engaged with the structure has the advantage that the skids do not participate at any extent in the moving process. The skids (the "legs" of the AV) have to be elastic in order to absorb landing shocks and be of light weight. Therefore, it is preferable that they have no load-transferring role. However, if in a specific AV design the "legs" are sturdy enough to withstand the necessary loads, they could be engaged by the heaving robots. In such case "legs" could be even provided with small wheels and the dolly could dock to the AV without actually heaving it but just tow it. After having moved the AV to the designated spots, the heaving robots may detach from the AV. As a further alternative to the vertical motion of components of the heaving robot, in certain embodiments, engagement of a wheeled platform with the AV may be achieved by using a lowering mechanism associated with the AV, as discussed further below with reference to FIGS. 14a-15h. The platform may either be an active heaving robot (otherwise as described above) or a passive dolly without independent propulsion capabilities. In the latter case, an external displacement mechanism, such as heaving robots, or any other drive system may be used.

When transporting the AV on a dolly, even for short distances, care must be taken to maintain the integrated vehicle's stability in the lateral and longitudinal axes. For this reason, it is highly favorable to keep the integrated vehicle's center of gravity (COG) as low as possible. In super-copter implementations, the upper structure which supports the propulsion units adversely contributes to stability by raising the COG. The same applies for the part of the structure connecting the cabin roof to its floor. Moreover, at certain super-copter implementations, in order to be close to the propulsion units' batteries are placed above the cabin roof or close to it, which further adversely contributes to stability by further raising the COG. All these adverse contributions are avoided in the sub-super design. A sub-super design is therefore particularly suitable for handling the AV by a dolly for taxiing and recharging purposes.

A further consideration in favor of the sub-super design emerging in view of the vertiports, as will further be described, is the AV footprint during taxiing and battery charging. An inventive solution to minimize such footprint is stowing the propulsive units after landing. Unlike a sub-copter design or a pure super-copter design, a sub-super AV design, as per FIGS. 3a-3c, may be convenient for such stowing, as further described.

To summarize, the unique sub-super-copter design according to an aspect of the present invention preferably has one or more of the following distinct advantages:
(a) Safety in landing due to the rotors' location above the cabin rooftop level. This keeps them in a high clearance from the ground and at the same time maintains the rooftop clear of any danger of hammering by the supported weight.
(b) Structural weight saving.
(c) Low center of gravity, facilitating handling by dolly and providing enhanced ground safety.
(d) Convenience for propulsive system design (if required).

FIGS. 6a-6f and FIGS. 7a-7d describe a design according to an implementation of an embodiment of the invention, which allows reducing of AV dimensions by stowing the propulsion units over the cabin roof. In certain particularly preferred implementations, the stowing motion is performed at least in part by rotating at least part of an arm supporting the propulsive units about a substantially vertical axis, where "substantially vertical" refers to angles within about 20° of vertical, and most preferably within about 10° of vertical. In order to better define the reduction in dimensions achieved by stowing the propulsive units, reference is made herein to a geometrical definition of the "effective thrust tunnel". The "effective thrust tunnel" is defined herein for a deployed propulsive unit (or group of coaxial propulsive units) as the cylindrical volume within which thrust is principally generated by the propulsive unit during operation, having a cross-sectional area typically corresponding to the area of action of the thrust-generating elements, and extending axially above and below that area to a distance of three times the diameter of that area in the outflow direction (i.e., below) and one-and-a-half diameters on the side of the inflow (i.e., above). In the non-limiting example of a spinning rotor, the "effective thrust tunnel" is defined as the cylindrical volume extending perpendicularly upstream and downstream from the disk swept through by the rotor when rotating about its axis. Overlap or intersection of the thrust tunnels with the cabin is preferably avoided in the flying configuration. This geometrical definition is used to describe the geometric "flow tunnel" of each propulsive unit also in the stowed state, as the combination of the two cylindrical bodies extending upstream and downstream with their base area corresponding to a disk of diameter equal to the rotor diameter centered on the motor axle and extending axially three rotor diameters in the outflow direction and one-and-a-half diameters on the side of the inflow, even where the rotor does not actually have space to turn in the stowed state. A common design is where two rotors share a common axis of rotation, i.e., coaxial rotors. Where two rotors share a common axis of rotation, the rotors/motors sharing a common axis are referred to for the purposes of geometrical definition of the deployed and stowed configurations herein as a single propulsion unit, with a shared "effective thrust tunnel" the axial extent of which is defined from above the upper rotor and from below the lower rotor. Using the above definition, the effective thrust tunnels of the different propulsion units are preferably deployed in the flying configuration so as to be mutually non-overlapping and non-intersecting, whereas when they are in their stowed positions, each of the effective thrust tunnels preferably intersects and/or overlaps with at least one of the effective thrust tunnels of another propulsive unit. Overlap of the thrust tunnels in stowed state is a key feature of certain particularly preferred implementations of the present invention for providing a design with minimal footprint in such state. In certain particularly preferred implementations, in the stowed position of the propulsive units, all of the effective thrust tunnels overlap the cabin. For the sake of definition, two effective thrust tunnels are described as "intersecting" if there is a certain volume in space which geometrically pertains to both of them, and are considered "overlapping" if the effective thrust tunnel of one propulsion unit intersects the area of action of the thrust-generating elements of another propulsion unit.

An example of such a stowing process, resulting in a compact over-the-cabin configuration, is shown in FIGS. 6a-6f and FIGS. 7a-7d addressed further below. In order to achieve compact stowing, the multicopter rotors are preferably unshrouded, which is to a certain extent at the expense of the achievable thrust. For the same reason and at similar expense, most preferably, only two blades are provided for each rotor. It is to be noted that sequential folding of the propulsive systems is necessary in order to enable the various thrust tunnels to intersect and thereby save overall vehicle dimensions in comparison with a design in which the thrust tunnels do not intersect in a stowed configuration.

Figure 6D:
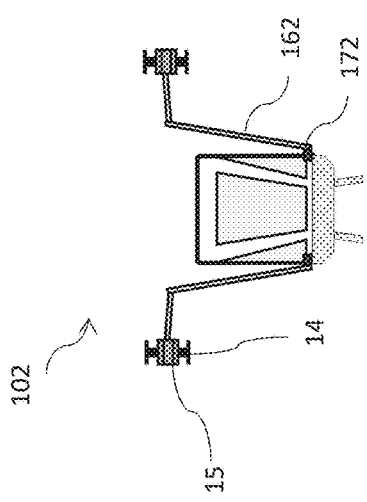
FIGS. 6d-6f are schematic front, top and side views of the AV according to an embodiment of the present invention, with propulsion units in a stowed position.
Figure 6E:
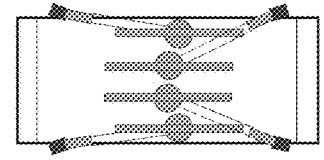
Figure 6F:
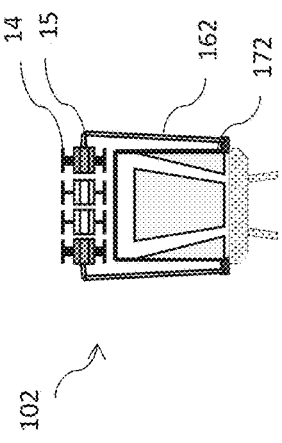

Stowing the propulsive systems for ground travel, with the AV being docked to a dolly as it will be further detailed, enables compliance with the dimensional limitations of ground transportation systems. In some cases, elements of the propulsive assembly of the AV may be stowed and possibly secured to the structure of the cabin or to at least another element of the propulsive assembly. Stowing of the propulsive elements preferably still enables unimpeded exit/entry of the passengers from/to the AV cabin. FIGS. 6a-6f illustrate an exemplary configuration and process for stowing the propulsive elements of a sub-copter with upwards extending arms. In this case, stowing of the propulsion units is preferably effected by rotation of the support arms near the base of the arms about a substantially vertical axis 180 in a specific sequence and with coordination of alignment of the rotors, so as to bring them into a particularly compact configuration, substantially aligned with the forward direction of motion of the cabin (and hence also ground vehicle), as best seen in FIGS. 6d and 6e. A range of types of actuators (not shown) and load-bearing joints may be used to implement the stowing mechanism, including but not limited to, rotary electric motors, hydraulic actuators and ball-screw-based linear electrical actuators, as will be clear to one ordinarily skilled in the art. By employing rotation about a substantially vertical axis for the stowing and redeployment reconfiguration, power requirements for the reconfiguration are minimized, since the weight of the propulsion units does not need to be significantly raised or lowered.

An example of a preferred folding sequence for the arms is illustrated in more detail in FIGS. 7a-7d. At the initial position, the front rotors 702 and aft rotors 708 are assumed to be at an arbitrary angle relative to the front arms 704 and aft arms 706, respectively (FIG. 7a). First, all rotors are rotated to a predetermined angular position respective to arms (FIG. 7b). The rotor angular position is accurately determined, for example, using angular resolvers and can be controlled using the electric motors attached to them. In the embodiment described in the figure, the front rotors 702 are fully aligned with their arms, whereas the aft rotors 708 are positioned at a small angular displacement from their arms. It should be noted that the relative angle between each arm and its respective rotor as depicted in FIG. 7b is determined by the relative angles thereof as required for folding them according to the designated pattern as depicted in FIG. 7d so that, at the end of the folding motion, the rotors are in an optimally compact configuration, most preferably substantially parallel. Thereafter, the aft arms 706 are rotated over the cabin (FIG. 7c) and in certain preferred implementations, make physical contact between elements thereof (such as between the motor casings). In the sequence of stowing a propulsive unit as illustrated here, the position of the rotor relative to the arm are set to a pre-determined angle and remain at that angle throughout the stowing. However, at the arm folding process various the rotor may be exposed to various loads which may act on the rotor to change this angle. In order to keep the rotor at the predetermined angle relative to foldable arm, two alternative schemes may be applied: (a) a mechanical device at rotor level or within the motor may be implemented in order to lock the rotor at the predetermined angle, or (b) the rotor angle may be continuously controlled by the motor controller, receiving angular feedback from e.g. an encoder or resolver implemented at the motor and acting to keep the rotor at the constant angle. According to a variant implementation, the rotor angle may not be fixed relative to the arms during folding, and instead may be actively aligned as a synchronous motion during the folding of the arms. For example, the rotors may be aligned in a front-back direction relative to the cabin prior to folding of the arms, and the rotors may then be rotated in an opposite direction from rotation of the arms during folding to maintain the front-back alignment during the motion.

Last, the front arms 704 are rotated over the cabin (FIG. 7d) and preferably also make physical contact with elements of the aft arms (again, such as between the motor casings).

The deployment sequence for returning the AV to its flight configuration prior to takeoff is preferably similar to the folding sequence in reverse. After deployment in the flight configuration, each of the foldable arms is preferably locked in order to prevent folding for any reason during flight. An advantage of the folding and unfolding sequences as described herein is that, for each pair of arms which rotate simultaneously, the rotation is preferably simultaneous and in opposite direction so that the total yaw moment exerted on the AV, and propagating to the dolly, is largely canceled out.

It is understood that a design with other numbers (such as 6 or 8) of individual propulsive systems positioned above cabin roof level, each connected to the AV bottom structure through an upward extending arm, stowable by pivoting about a substantially vertical axis is feasible according to the same principles.

Folding by pivoting around a vertical axis may have the additional benefit by enabling a lower section of the arm 162 to be vertical. In such a case, the vertical section of the arm 162 may additionally be pivotably connected to the cabin structure, in addition to the pivotal connection to the bottom structure, in order to mitigate dynamic effects. In such case the cabin itself would have a more rigid structure. Though such approach may increase cabin weight it would enable arms weight saving and could lead to overall weight saving, with all the beneficial consequences thereof.

It should be noted that the foldable arms 162 may feature various shapes other than the two-segment design as depicted in FIG. 6a-6f. For example, an arc-shaped or otherwise curved arm, with a substantially vertical lower end and a substantially horizontal upper end may be implemented.

Although described herein as using non-ducted rotors (without a shroud) to facilitate the folding process, it should be noted that certain implementations of the present invention may have certain add-on components in their flight configurations, such as, for example, a rotor shroud or a rotor protective rail may be provided, and may be detached (typically robotically) from the AV after landing and before folding, and reattached (again, preferably robotically) to the AV after deployment of the arms and prior to takeoff.

Figure 8F:
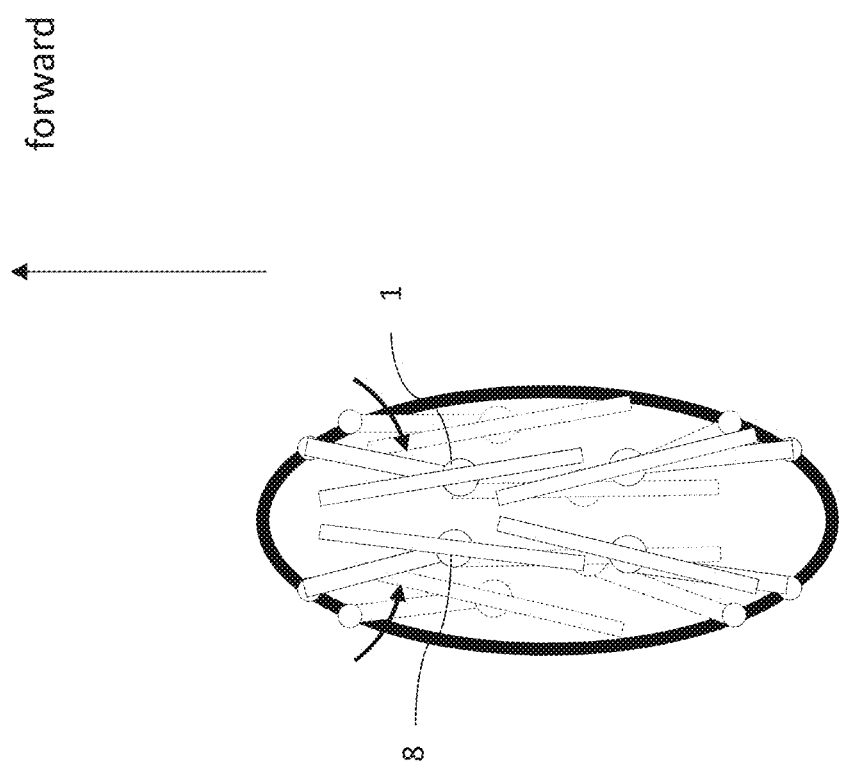
Figure 8E:
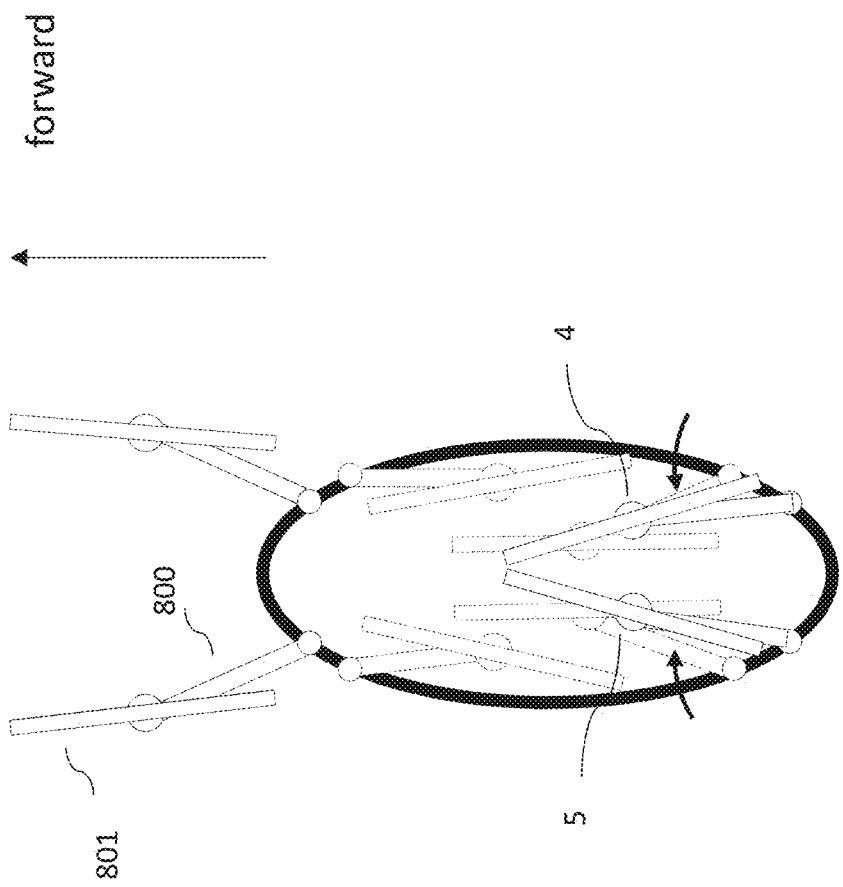

Another preferred embodiment of a multicopter is an octocopter as depicted schematically in FIGS. 8a-8f. In this implementation, each one of eight propulsive elements (which may be interchangeably referred to as propulsion units or propulsive units) is supported by an arm, each arm having a fixed arm section 808, which is essentially vertical and attached at its lower end to the cabin bottom structure, and an essentially horizontal foldable arm section (which may be also referred to as foldable arm). This essentially horizontal foldable arm section, 800 for rotors 1,4,5,8 and 802 for rotors 2,3,6,7, is hinged at one end to the fixed arm section and supports the propulsive unit (rotor-motor assembly) at its free end. The folding of the foldable arm section is effected by a stowing mechanism, including but not limited to rotary electric motors integrated with or otherwise mechanically linked to the rotary joint between the two arm sections. The various fixed arm sections could be of different lengths, thus enabling stowing the propulsive elements atop the cabin level in more than one layer (or tier). Unlike in the earlier embodiment, the arms are here shown as being interconnected by a rigid structure which may enhance rigidity of the arms or otherwise take part of the load otherwise fully supported by the arms. The rigid interconnecting structure may include several rods which may constitute a quasi-elliptic ring. The connection of the ring to the arms may be at hinge level or below the hinge level. The essentially horizontal interconnecting structure may be in one plane in case of a single tier of propulsive elements or non-planar in a shape to accommodate a multi-tier design. In some cases, the interconnecting structure may be connected to the cabin and in such case the cabin itself would have a more rigid structure. Though such approach may increase cabin weight, it would enable weight saving in the arms and in the interconnecting structure and may lead to overall weight saving, with all the beneficial consequences thereof. A specific example is described hereinafter in further detail. FIGS. 8a-8b display top views of the octocopter with deployed propulsion units. There are two tiers of propulsive units, the upper tier propulsive units 1,4,5,8 are supported by upper tier foldable arms 800 connecting to upper hinges 812 and the lower tier propulsive units 2,3,6,7 (illustrated with dashed lines in FIGS. 8*a*-8*f*) are supported by lower tier foldable arms 802 connecting to lower hinges 814. As can be seen in FIG. 8*a*, in the deployed configuration, the thrust tunnels of the propulsive units are mutually non-intersecting. FIG. 8*b* shows the angular positions to which the various rotors 801 are brought pending the folding of the various foldable arms. It should be noted that the relative angle between each arm and its respective rotor 801 as depicted in FIG. 8*b* is determined by the relative angles thereof as required for folding them according to the designated pattern as depicted in FIG. 8*f*. FIGS. 8*c*-8*e* depict the stowing of propulsive units 3 and 6, propulsive units 2 and 7, propulsive units 4 and 5 and propulsive units 1 and 8 respectively. FIG. 8*g* is a schematic side view of the structural concept of the cabin, the arms and the interconnecting structure. As can be seen, the quasi-elliptic interconnecting structure 806 is bent according to the relative height of the upper-tier and lower-tier propulsive units. The length of the fixed arm sections connecting with the upper-tier foldable arms relative to the length of the fixed arm sections connecting with the lower-tier foldable arms is to be designed to assure that in stowed condition the lowest surface of the upper tier propulsive unit is above a horizontal plane higher than the highest surface of the lower tier propulsive unit.

It should be noted that since the upper- and lower-tiers are vertically non-overlapping, the folding sequences for each tier may be scheduled in parallel, which is preferable in terms of total folding time.

All other respects, the structure and function of this embodiment are similar to the earlier embodiment, and features and functions described in relation to either embodiment may be used interchangeably between the embodiments except where specifically stated otherwise. The rotors layout option as described in FIGS. 8*a*-8*f* is advantageous and preferred in several aspects as will be hereby described. First, it is a "true" octocopter design in the sense that is produces eight distinct air tunnels (1-8 in FIG. 8*a*) contrary to e.g. the design shown in FIGS. 6*a*-6*d* which produces only four air tunnels. This has a substantial effect on the required lift power, which is dependent on the total cross-section of these tunnels. Second, where the pivotal joints of the folding sections of the arms are relatively close, folding of each pair of propulsive units 1 and 2, 3 and 4, 5 and 6, 7 and 8 may advantageously be actuated by one common folding actuator per pair with appropriate gear connections.

An important consideration in the design of the electrical system is providing maximum redundancy. This may be achieved, e.g. by dividing the eight propulsive units into two quadruples, the first one 1 and 3 and 5 and 7, and the second one 2 and 4 and 6 and 8, implementing a separate power supply system for each quadruple. A galvanic separation of the power supply to the two quadruples ensures that an electric failure at one electrical system does not propagate to the other, so that four propulsive units will remain operational. In a preferred embodiment, each quadruple of propulsive units can generate separately, at least for a short period of time, the lift required to land the AV safely. Another redundancy option is supplying the power separately to each pair of diagonally opposite propulsive units, i.e. 1 and 5, 2 and 6, 3 and 7, 4 and 8 wherein in case of an electric failure in one of the pairs, three other pairs would be unaffected and thus a total of six propulsive units would remain operational.

Stowing time (or folding time) of the propulsive system is of great operational importance for the entire vertiport system as it is serial in the time sequence of landing and taxiing and it directly affects the permissible landing time of the next air vehicle on the same landing pad. A design featuring two tiers of foldable propulsive units (motor+propeller) such as described above, with a folding means (such as a rotary actuator at the hinge level) is advantageous in terms of folding time due to several reasons: (a) the sequential folding of the 4 propulsive units in the two tiers can be performed simultaneously (upper tier and lower tier at same time). and (b) the foldable arms support just a single propulsive unit—therefore the moment of inertia around the hinge, which directly affects the folding time, is minimized compared to designs with arm systems that carry multiple propulsive units (such as for example depicted in FIGS. 6*a*-6*d*).

It should be understood that the autonomous stowing of the propulsive elements as described throughout the specification is a key element for time-effective and reliable operation of the entire transportation system. Stowing the propulsive elements before passenger egress is important in terms of passenger safety and achieving compact dimensions for taxiing.

It should be understood that stowing propulsive units (motors and rotors) above the cabin roof may be also achieved by linear motion as well, preferably in a horizontal plane above the cabin. It should be also understood that there might be some propulsive units which may be not stowed in case that their contribution to the overall footprint is tolerable.

Vertiport—Rooftop Terminal Operation

The stations serving Vertical Take-off/Landing aircraft are generally referred to as Vertiports. Vertiports located on naval vessels are taught for example in U.S. Pat. Nos. 3,785,316 and 5,218,921. A rooftop Vertiport is taught in WO2019020158. In some cases, several floors or levels on the vessel or in the building are needed, including the usage of sizable elevators in order to accommodate the required number of air vehicles in a limited projected area (or surface footprint), as also taught in conjunction with aircraft carriers in US Patent Application 20100294188.

As per the above examples, a Vertiport has at least one flight deck with at least one landing pad, a passenger terminal as well as queuing and energy provisioning areas. Other than the flight deck, all other functions are preferably performed in covered areas such as hangars or other buildings. As a matter of definition, a Vertiport has a total floor area, which is the sum of the areas of the individual levels, e.g., if every level has a floor area of 1600 $m^2$ and there are 3 identical levels, the total floor area is 4800 $m^2$. The Vertiport has also a surface footprint, such as the projection on ground of an urban Vertiport or the projection on sea of a naval Vertiport. In a multi-level Vertiport, the total floor area exceeds the surface footprint as there is at least partial overlap between the floor areas at the various levels. In the above example, the surface footprint is 1600 $m^2$, as compared to the total floor area of 4800 $m^2$.

In urban areas, Vertiport surface footprint may be a critical enabling consideration in locating a Vertiport at a certain location in town. The total floor area (to be purchased or rented by the operating company) has a direct impact on the operation costs. A large vehicle footprint has an adverse effect on the total floor area required and may necessitate multiple levels to accommodate a sufficient number of Air Vehicles in order to enable the desired take-off rate (transportation throughput). Furthermore, a multi-level design increases the investment as sizable elevators are needed to move the Air Vehicles between the levels and the time needed for elevator ingress, egress and inter-level motion may cause the cycle time for each Air Vehicle to be longer, thereby necessitating larger buffers. Contrarily, a compact Air Vehicle necessitates a smaller total floor area. For example, a 1600 m² area (typical of an urban rooftop), can accommodate a queue of 20 vehicles of an 8 m² footprint, along with the other functionalities (terminal, flight deck, energy provisioning).

Preferably, the transportation system based on urban transportation Air Vehicles is to be run by an operating company that provides Air Vehicles, Vertiports and other necessary supportive systems. In dense urban areas, it is of special importance for the Vertiport to be easily accessible to passengers in town. The location of the Vertiport in town has to take into account the scarcity and cost of real estate resources in town—therefore the Vertiport area should be particularly minimized and preferably the Vertiport be located on roof-tops of standard urban buildings.

Furthermore, it is of importance that once a passenger arrives at a Vertiport, an AV is readily available for him/her without an undue waiting time. To that end, a high traffic throughput capability (preferably capable of a take-off roughly once per minute) is required. To satisfy such requirements, a plurality of AV's, preferably at least 10 at a time, have to be accommodated at the vertiport, ready to serve departing passengers. Also, the process of passenger embarkation at the Vertiport terminal and taxiing to take-off pad have to be streamlined. Last but not least, energy must be provisioned to an incoming AV, readying it for passenger embarkation.

Take-off/landing as well as flight performance of a VTOL passenger Air Vehicle, necessitate an appropriate rotor disc area which typically results in a 10 m*10 m footprint. Queueing up a multitude of AV's with such footprint is incompatible with the requirement of minimal area vertiport (typically 40 m*40 m). As a key enabler in resolving such discrepancy, the present invention suggests automatic stowing (preferably folding) the propulsive systems (including the rotors and motors) short time after landing, thus reducing the AV footprint after landing to that of a typical car (preferably less than 3 m across, more preferably less than 2.5 m across, and most preferably, within a footprint of about 4 m*2 m) and thereby enabling to accommodate a multitude of AV's in a vertiport.

Further to queuing up a multitude of AV's, another key enabler to high traffic throughput is handling the AV at the rooftop by robotic systems for taxiing and/or energy provisioning purposes. Energy provisioning by handling robots could include (depending on the type of AV) batteries charging, batteries swapping, fuel tank swapping, fuel replenishing. For that end, the handling robot itself (as an energy provisioning intermediary) is preferably provided in an off-line process at a Vertiport energy outlet with the energy resource to be transferred to the AV. Such energy provisioning to the handling robot is also performed by a robotic device at the Vertiport energy outlet, most preferably with a task time of no more than about one minute.

According to certain particularly preferred aspects of the present invention, there are three functional loops at the Vertiport:
The Air Vehicle (multicopter) loop—landing, docking with handling robot, stowing propulsive units, taxiing from landing to terminal, disembarkation, being provided with energy, queueing, embarkation, taxiing from terminal to take-off pad, deploying propulsive units, undocking from handling robot, taking off
Handling robot loop—Docks with an AV at landing pad, takes AV from landing pad to terminal arrivals gate and therefrom to queueing zone, undocks from AV with empty energy store and proceeds to energy bank delivering discharged energy store to energy bank, receives replenished energy store from energy bank and proceeds to an AV at queueing zone, docks with AV, provides energy to AV and proceeds to departures gate and therefrom to take-off pad, undocks from AV prior to take-off and proceeds to landing pad.
Energy bank loop: Energy bank receives discharged energy store from incoming handling robot, moves it to replenishing assembly and provides replenished energy store to outgoing handling robot.

The three loops are coordinated in time but not synchronized. Specifically, a transportation system needs buffers because of imbalances in the various rates of events involved in its operation. For example, if it is desired to have a take-off at every minute but the cycle of handling the Air Vehicle at the Vertiport takes 5 minutes, one needs to have at least 5 Air Vehicles in the queue. According to the same reasoning applied when addressing swapping of energy stores (such as batteries), if the replenishing (e.g. charging of batteries) takes 30 minutes, one needs to have at least 30 energy stores in replenishing process at the energy bank. The energy bank is therefore to be compact—for example the best choice in case of batteries is to stock them vertically in the charging device in order to save footprint. As the form-factor of the energy stores is considerably smaller than that of the Air Vehicle or the handling robot, the energy stores are readily elevator-compatible, and therefore their replenishing may be conducted at a different level and only the energy bank inlet and outlet be located at the at queueing/energy provisioning level. Thereby the surface area to be allocated for the energy bank at the Vertiport queueing/energy provisioning level can be further reduced.

The existence of the buffers as mentioned obviates the need for the synchronization of the various events mentioned.

The compactness of the Air Vehicle in its ground configuration (preferably with a total width below 2 m) facilitates parallelization of the Air Vehicle traffic at the Vertiport—namely maintaining at least two traffic lanes from landing to take-off, so that if there is any interruption in one of the lanes, traffic can continue through the second lane. This parallel processing, preferably with two lanes with a typical total width of 6-8 meters for at least part of the functional cycle path, can be implemented as an adaptation to each of the various vertiport layouts described below, as will be clear to a person having ordinary skill in the art. It should be noted that this parallelization is of particular importance in high-volume transportation systems, where landings are tightly scheduled within short intervals (for example, in the range of 20-40 seconds between landings). In a single-lane (purely sequential) handling scheme, such as a conveyor belt, any interruption of the AV flow might propagate upstream and deny the following scheduled landings. This is especially dangerous for incoming AV's with limited endurance which cannot wait for the flow recovery or reach an alternative vertiport and might therefore be forced to perform an emergency landing.

Figure 9:
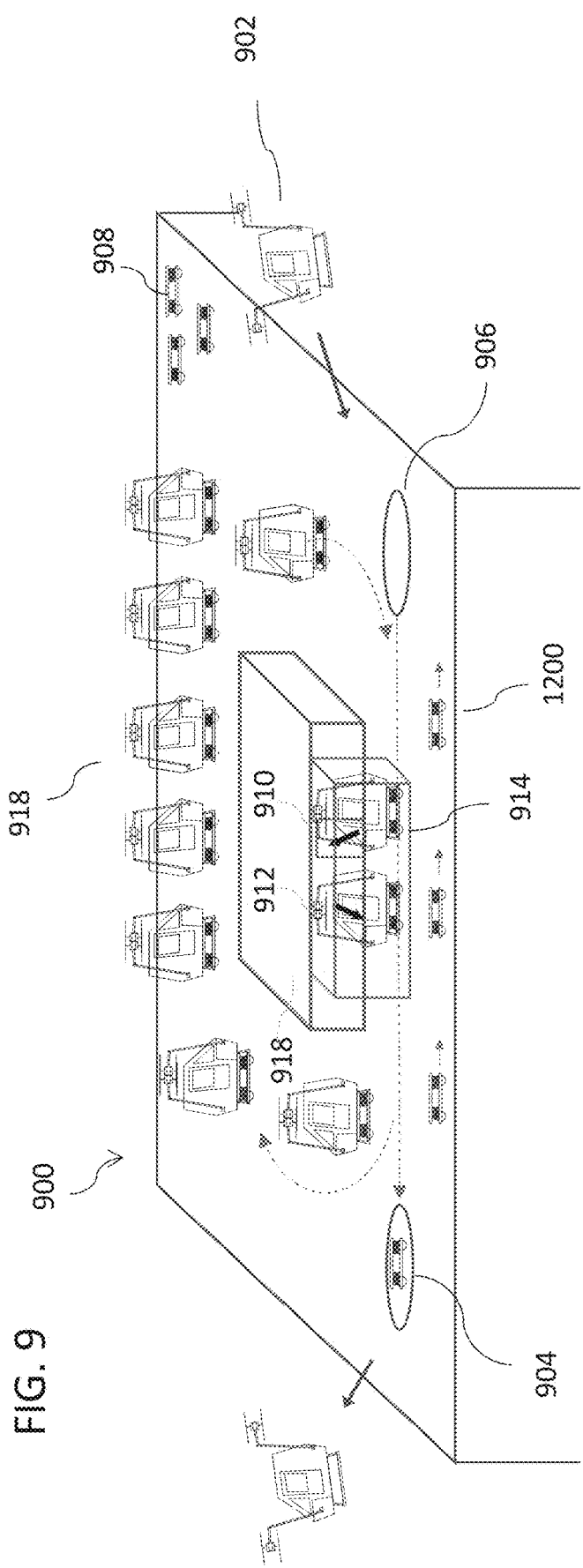
FIG. 9 is a schematic isometric representation of a first implementation of a Rooftop Terminal according to the teachings of a further aspect of the present invention.
Figure 11:
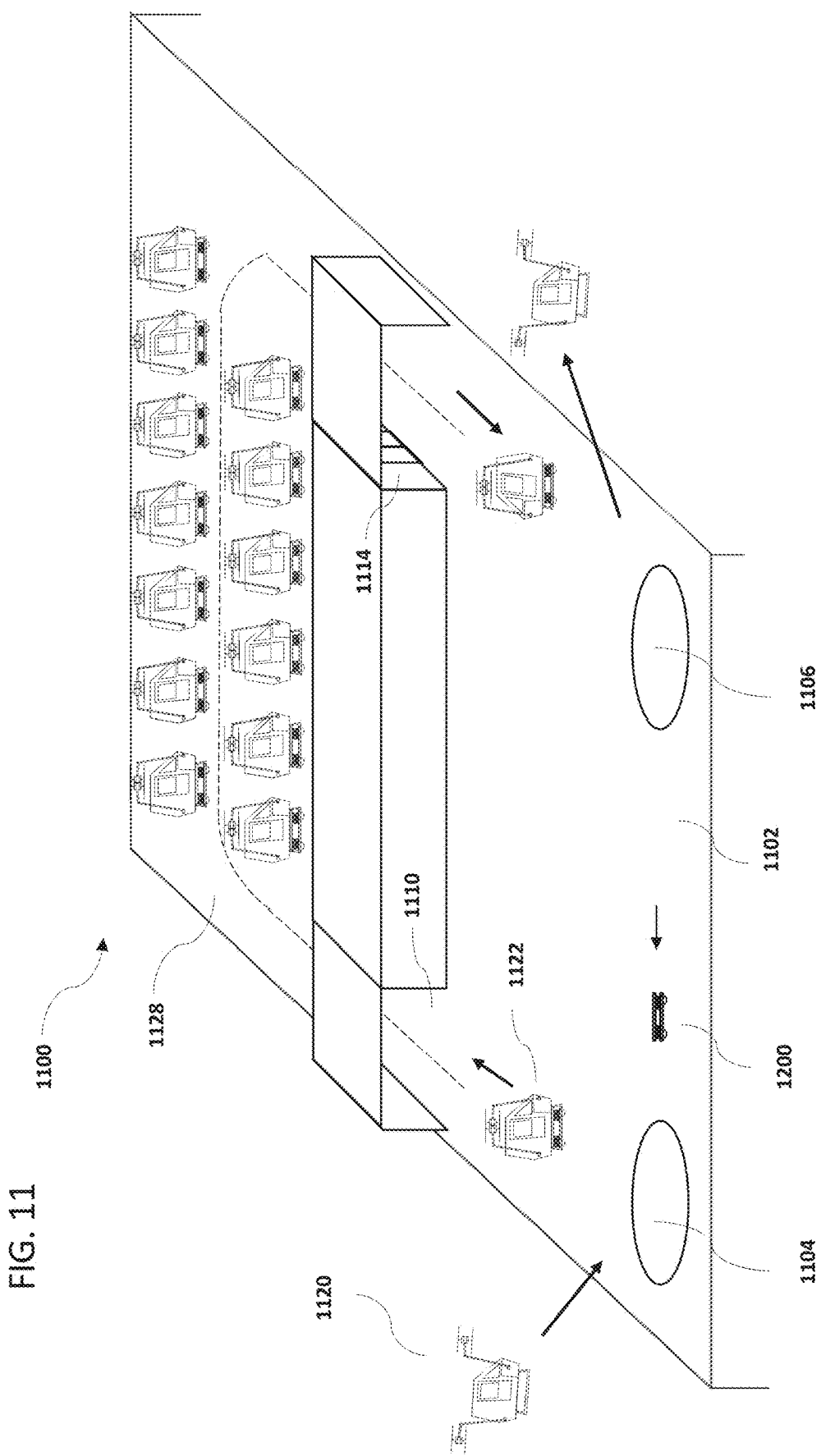
FIG. 11 is a schematic isometric view of a third implementation of a Rooftop Terminal according to the teachings of a further aspect of the present invention.

Turning now to features of a particular exemplary implementation of a rooftop terminal or vertiport in more detail, these are illustrated schematically in FIGS. 9-11. This embodiment preferably employs a heaving robot capable to handle an AV according to any of the above embodiments, and various features of the vertiport system and method of operation are also applicable to any other form of AV which can be automatically (preferably autonomously and/or robotically) reconfigured after landing to reduce their footprint while still allowing passenger egress and entry, and reconfigured prior to takeoff to return them to their flight configuration. The heaving robot is preferably configured to autonomously position itself under the AV and to engage the AV (typically by lifting the AV, or alternatively, in some cases, by the AV lowering itself) and to move the AV from its landing spot for purposes such as disembarkation, parking, fueling/charging, embarkation, and take-off. Numerous solutions for, and aspects of autonomous handling of a multitude of vehicles in a defined ground area have been taught in a large number of patent applications and patents, for example US Patent Applications 20170008515, 20170313305 and 20150353080 and therefore the autonomous handling of AV's at vertiports as involved in the implementation of the present invention is within the realm of knowledge and expertise of the qualified engineers in this field.

FIG. 9 depicts a layout of a rooftop terminal 900 according to Design A. An AV 902 lands at a designated landing site 906 and is engaged by a heaving robot 1200. After being engaged by the heaving robot, the AV propulsion assemblies are stowed and the AV is moved by the heaving robot to an essentially indoor embarkation/disembarkation site 914, which might have several sliding doors to maintain an air-conditioned space for disembarkation/embarkation and exit/entry. At the embarkation/disembarkation site, the passengers leave the rooftop area through entry door 910, entering rooftop hall 918. The AV is further moved to exit door 912. If there is a departing passenger in line at exit door 912, the passenger will embark the AV, the AV will be automatically drive away, deploy its propulsive elements and take off from dedicated take-off site 904. Subsequently, heaving robot 1200 moves back towards landing site 906 to service further landing AV's. In case that there is no passenger inline at exit door 912, or where the AV requires between-flight charging or maintenance, the AV is moved with its propulsive elements stowed onto a buffer zone 918 which can accommodate a large number of AV's in stowed condition. At a further point in time, when there are passengers lined-up at exit door 912, the heaving robot moves the AV from the buffer zone 918 to exit door 912, and after passenger embarkation, to the take-off site 904. Several heaving robots 1200 are meanwhile queued at a designated zone 908 as backup for the operational ones, and are preferably recharging their own batteries (recharging is not shown in FIG. 9).

It will be noted that bringing the AVs sequentially to predefined locations of one or more disembarking and boarding gates provides notable logistical and safety advantages compared to schemes requiring the passengers to approach the take-off area and/or disembark from a landing area.

For existing AV's which do not fold during their normal operational cycle, implementing a multi-level vertiport design significantly increases the capital investment compared to a single level design as correspondingly large elevators are needed to move the Air Vehicles between the levels.

These elevators cause the cycle time for each Air Vehicle to be longer, thereby necessitating larger buffers. The peers utilized for these elevators are by themselves highly area-consuming. As these elevators are a critical part of the vertiport's operational cycle, they require high up-time ratios, which translates into high maintenance costs. For existing buildings, retrofitting such elevators to their top floors must take into account numerous considerations such as structural limitations. For an existing building, the cost of converting the top floors into a multi-level vertiport may be prohibitively high.

In contrast, for a reconfigurable AV with a compact taxiing state according to an aspect of the present invention, since the required elevators are of small size, a multi-level vertiport can be implemented using elevators similar to a large ordinary passenger elevator, within standard peers, obviating the need for substantial capital investments. The required buffer areas on the airfield level (required as a safety measure vs. malfunction of the elevators) are also smaller. All of the above factors greatly facilitate implementation of a multi-level vertiport design (such as depicted in FIGS. 10a and 10b.)

FIGS. 10a and 10b depict a layout of a rooftop terminal 1000 according to Design B. The AV lands at one of landing spots 1004, is engaged by a heaving robot 1200, the propulsive elements are stowed and the AV is lowered through one of elevators 1002 to a lower-floor parking facility 1010. Disembarkation/parking/embarkation are conducted at the lower-floor level. Prior to take-off, the AV is brought to the rooftop by one of elevators 1008. Subsequently, heaving robot 1200 moves back towards landing site 904 to service further landing AV's.

Both Design A and Design B, as well as the subsequently described Design C, enable a convenient, safe, compact and highly area-efficient rooftop site with a high throughput and buffer/parking area for servicing, recharging etc. of the AV or to ensure sufficient availability of AVs at time of peak demand. Moreover, since a site of this type typically requires merely minor infrastructure modifications to existing rooftops, it is relatively straightforward to retrofit it at existing buildings, which is obviously crucial for its fast proliferation. In case of new buildings in urban areas, the present design does not necessitate extra real estate resources, as it fits onto the dimension of regular urban buildings, unlike vertiports for VTOL's with tilt rotors which may necessitate very large dedicated buildings to accommodate them. It should be noted that the AV docking to the dolly can greatly streamline the smooth operation of any terminal (rooftop or other).

It is to be emphasized that the dolly concept is quite different than using a means such as a conveyor belt for moving the AV from landing pad to the terminal. Although conveyor belts are a very popular means for facilitating motion in a flowing system such as pedestrian passengers at airports, there are serious drawbacks to applying the method for moving the AV as part of the vertiport functional cycle. Some of the drawbacks of the conveyor methods are: (a) Substantial embedded infrastructure is required (b) Difficulty to handle situations with traffic from several landing pads converging to the same terminal (c) Any malfunctional in the conveyor belt essentially propagates upstream and may delay subsequent landings due to the jam-up. (d) Additional means and attention needed to place the AV on and off the conveyor belt and to start/complete their motion. Simply stated, this is a "last yard" problem, inherently solved by the dolly.

A further option for moving the AV would be providing it with integral wheels that would be driven by integral motors. Such option involves additional flight weight and mechanical complexity and is void of the option of "recharging in motion" that the dolly could provide as will be subsequently described.

We furthermore expand on the design and functionality, both at air-vehicle and ground systems level, in order to best explain additional aspects of the invention. As already explained, the automated design and the duality of vehicle configurations (Air/Ground) are key enablers of certain aspects of the invention for streamlining the passenger travel process and enabling a high traffic throughput. In addition, stowing of some of the propulsive units may be beneficiary according to ground motion and handling space limitation, in particular at a Vertical Takeoff/Landing (VTOL) Airports.

Vertiport Functional Cycle

In general, a Vertical Takeoff/Landing (VTOL) Airport (which may also be referred to as Vertiport), includes three distinct zones, each of them of a different functionality:

(a) Flight-deck (or airfield), including landing and takeoff pads and taxiing routes to the air terminal. the taxiing being preferably performed automatically.

(b) Passenger terminal, most preferably indoors, in which embarking passengers proceed to the departures gate and may wait until being called, and disembarking passengers exit from the arrivals gate.

(c) Queuing zone, in which AV's may queue up after passenger disembarkation at the arrivals gate. Further, AV's are automatically moved onto the departures gate and may be supplied with energy resources for further flight (such as battery charging, batteries or fuel cell swapping, or fueling). The queuing zone will preferably be indoors to avoid exposure to environment (temperature, humidity, wind, rain, solar radiation). Despite usage of the term "queue", it is understood that the order of AV for proceeding to the departures gate may be determined not necessarily according to time of queue entry (FIFO—First-In First Out). For example, priority may be given according to the order of AV energy supplying completion. In a further example, when AV's of different types are present in the queuing zone, priority may be given to an AV of the type that is demanded for the next outgoing flight.

Note: The three zones detailed above may be at the same floor level or at different floor levels. As a matter of functionality and safety, passengers in the airfield are confined to the AV, and no passengers are allowed in the queuing zone. Moreover, in certain implementations the three zones may be located at larger distances from each other, such as hundreds of yards. This may be the case for example at a ground vertiport where each of several AV operating companies may have its own passenger terminal and queueing zone, and all operating companies share a common flight-deck.

A key device for the automatic handling of the Air Vehicle at the Vertiport is the dolly, which is a particular case of the handling robot (or heaving robot) as previously taught. The dolly may perform some of the following functions:

(1) Autonomously approaching the AV landed at the Landing pad and docking with it.

(2) Heaving the AV up and down as required.

(3) Taxiing the AV from the landing pad to the passenger terminal and vice-versa.

(4) Moving the AV from arrivals gate to the queuing zone, within queuing zone and from queuing zone to departure gate.

(5) Automatically undocking from AV and departing from Takeoff pad.

(6) Providing means of stabilizing the AV during taxiing.

(7) Facilitating energy supply to the AV for further flight (such as battery charging, batteries or fuel cell swapping, or fueling). This energy supply by the dolly may be preferably conducted even while AV is progressing in the queuing zone or taxiing in the airfield.

The general outline of the vertiport 1100 according to Design C is presented in FIG. 11. On the flight deck 1102 there is at least one landing pad 1104 and at least one takeoff pad 1106. After an incoming AV 1120 lands on landing pad 1104, a dolly 1200 available on the flight deck autonomously approaches it and docks with it preferably by sliding underneath, attaching to it and heaving it. The docked AV configuration will be further referred to as interim configuration (or ground configuration) 1122. Heaving the AV 1120 is necessary in order to detach its skids from the surface on which it is to be moved and thus enable the wheels of the dolly to move it on this surface. After docking, the dolly 1200 may deploy auxiliary wheels, the purpose of which is to prevent overturning of the AV during taxiing due to winds, inertial forces or other forces that might act on it.

After deployment of the auxiliary wheels, which provide for ground stability, some of the propulsive units of the AV may be automatically stowed, preferably folded around vertical axes. Such folding operation is conducted before passenger egress from the cabin. In such condition, the AV is taxied onto the Arrivals gate of terminal 1100. At the Arrivals gate 1110, as well as at the Departures gate 1114, there are preferably sliding doors (not depicted in FIG. 11) which enable the passengers to disembark/embark at indoor conditions.

Following disembarkation, the ground configuration is further moved by the dolly onto the queuing zone 1128 awaiting to serve departing passengers. While in the queuing zone, the AV may be provided with energy supply for the subsequent flight. Once reaching the head of the queue, the AV is moved onto the Departures gate for indoor passenger embarkation. After passenger embarkation, the ground configuration exits the Air Terminal through sliding doors and the AV is taxied onto the takeoff pad 1106. At the takeoff pad, multicopter propulsive systems, if previously stowed, are deployed and subsequently started. At that time the AV is lowered so its skids contact the takeoff pad surface, the dolly undocks from the AV and moves away onto the flight deck 1102, awaiting to serve the next arriving AV.

In the queueing zone, as well as possibly in the passenger terminal zone, the AV docked with the dolly may be provided with energy necessary for further flight. Energy provision via the dolly is advantageous in that the Air-Vehicle can progress in the queue during energy provisioning.

The preferred first method for energy provisioning is charging AV energy resources (such as batteries or fuel) directly from dolly resources. The dolly resources may be filled off-line in a process that is less time-sensitive than the AV charging. For example, dolly batteries can be charged at times in the day when electricity rates are reduced, or during periods of low passenger activity.

Depending on the particular implementation, other energy provisioning methods which may be used include:

(a) charging AV batteries via the dolly from external resources, for example by contacting an electricity conductor such as a rail or a cable through which energy from an external source is provided to the dolly and therefrom to the AV—such method requires additional infrastructure to provide the feeding rail or cable.

(b) swapping of energy resources (such as batteries or fuel cells) between the AV and one or several dollies—such method requires providing the AV with dedicated mechanical devices such as doors and battery securing/releasing devices, which may adversely affect weight and reliability and necessitate additional maintenance activities. Essentially, for a battery pack to be easily swappable it must either be:

Placed at a position external to the AV. In this case, a rigid structure must be provided to support the pack weight. Moreover, in order to prevent the hazard of detachment during flight, fastening and securing mechanisms must be implemented.

Placed at an internal location. In this case, moving and guiding mechanisms must be used to guide it from outside the vehicle to its place.

Both options involve mechanical complexity and additional weight on the AV.

A further consideration is the robustness and integrity of the electric connection between the battery and the motors. The connecting cables bear high currents and voltages and must therefore be designed to be electrically and mechanically robust with preferably minimal number of connectors and minimal number of battery connections/disconnections which are internal to the AV and not just an interface of the AV as is the case of charging from the dolly. Repeated swapping of battery packs involves repeated detachments and attachments of electric connectors. Every such action causes wear and tear to the connectors, compromising their reliability and eventually flight safety.

On the other hand, when implementing a swappable battery pack on the dolly, as per the present invention, the electric connection between the AV battery pack and the motors can be non-detachable and therefore robust. Wear and tear on the electric connectors of the dolly is a standard maintenance issue and not a flight safety concern.

Notwithstanding the above design considerations, direct exchange of batteries or fuel cells of the AV itself remains an alternative approach which may be of commercial importance, in that it provides a particularly rapid manner of power provisioning to the AV for further flight.

After energy resources provisioning, the ground configuration may proceed to the departures gate 1016 for passenger embarkation. After departing from the gate and starting taxiing to the takeoff pad but still indoors, just before leaving the Air Terminal, the dolly stabilizing arms are deployed thus providing stability enhancement. When approaching the Takeoff pad 1018, the AV propulsive systems are deployed. At this time, the dolly stabilizing arms will be stowed, the dolly will lower the AV bringing the skids into contact with the ground, undock from the AV, lower its heaving platform away from the AV belly and depart from the AV, which is ready for takeoff.

A tandem seating design of the AV would be of considerable advantage for the Vertiport design and operation, as well as from AV flight dynamics and control aspects, as will be hereinafter detailed. The passenger cabin can accommodate several passengers seated in tandem, with two exit doors available for each passenger, one on each side. Such design results in a cabin of lower weight and width, lower drag coefficient and more privacy for the passengers. A further advantage of such configuration is that all passengers can embark/disembark in parallel on the side of the AV facing the Departures or Arrivals gates. This would allow better functionality and safety of the embarkation procedure than a configuration in which passengers embark on different sides of the cabin, were the passengers that embark on the side opposite the gate must traverse the AV route prior to embarkation.

It is to be noted that the dolly progresses only on designated surfaces which can be planned to be flat and smooth, and in a controlled environment, and moves at low velocities and accelerations, it does not have to be roadable. Therefore, it has little or no need of the automotive mechanisms normally employed in roadable vehicles, such as shock absorbers, brakes, collision protection, etc. This enables a compact design of the dolly, in particular in the vertical dimension, which is required for the act of approaching the AV from under its belly.

According to a preferred design, the dolly is provided with a swappable dolly battery unit at its top surface that interfaces with the AV belly. Such dolly battery is of sufficient capacity to charge the batteries of several AV's. When such dolly battery is empty, the dolly brings it to a swapping station in which batteries are charged in an operation that is decoupled from the AV operational cycle. In the swapping station, several dolly batteries are stacked for handling and charging in order to minimize area requirements.

The dolly 1200 is depicted in further detail in FIG. 12. The dolly is an autonomous vehicle with an automotive system of its own, which may include:

(a) Wheels driven by individual electric motors.

(b) A steering system.

(c) A navigation and control system including various sensors.

(d) Energy resources (such as batteries) for its own motion and its other functions.

(e) Devices for energy provisioning to the AV docked with it.

(f) Communication interface facilitating communication to the Vertiport command system which guides all vehicle motion at the vertiport.

(g) A mechanical interface for coupling with the AV, locking the AV to the dolly so as to prevent high lateral or vertical forces acting on either platform to break the coupling.

(h) A heaving mechanism for lifting the AV.

FIG. 12*a* illustrates a side cross-section of a dolly 1200 in retracted mode with no swappable battery pack coupled to it. The top plate 1202 supports four cone-shaped load-bearing structures 1206 which are used to bear the weight of the AV. Inside the load-bearing structures 1206, an electric interface 1207 is provided for delivering power from the dolly to the AV. The top plate 1202 also supports an electrical interface 1204 which is used to receive power from the swappable battery pack.

FIG. 12*b* illustrates a side cross-section the dolly 1200 in extended mode, and a side cross-section of a swappable battery pack 1212 (drawn unattached). Four holes 1218 are provided in the swappable battery pack at locations respective to structures 1206 on dolly top plate. An electric interface 1214 on the swappable battery pack, through which power is delivered to the dolly, is provided in location respective to dolly electric interface 1204. An electric interface 1214 on the swappable battery pack, through which power is delivered to the AV, is provided in location respective to AV electric interface 1204. The electric interface 1204 receives power from electrical interface of the battery pack 1214 and distributes power to the dolly mechanisms via a local electric network 1209. Power is distributed from the local electric network 1209 to the dolly driving system, to the lifting system and also to the electric interface to the AV 1207.

Figure 12C:
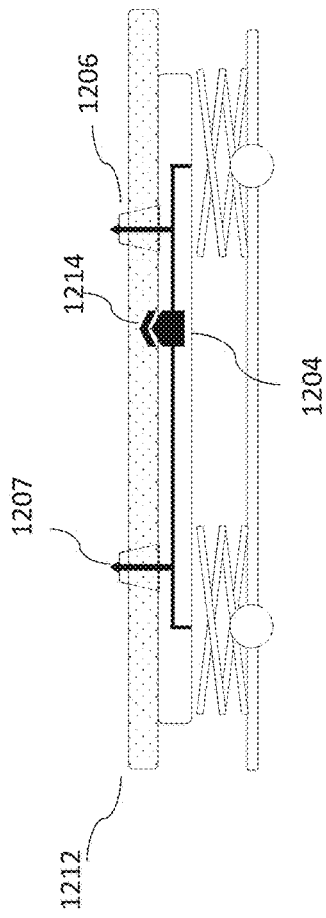

FIG. 12*c* illustrates a side cross-section of a dolly coupled to a swappable battery pack 1212. It can be seen that the load-bearing structures 1206 are inserted through the holes in the swappable battery pack 1208. It can also be seen that electric interface 1204 is coupled to an electric interface 1214 of the swappable battery pack.

Figure 12D:
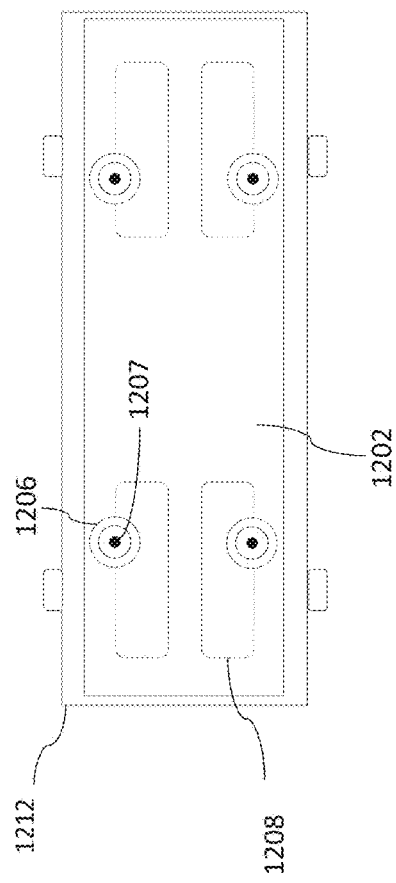

FIG. 12*d* illustrates a top cross-section of the dolly coupled to a swappable battery pack.

Figure 12E:
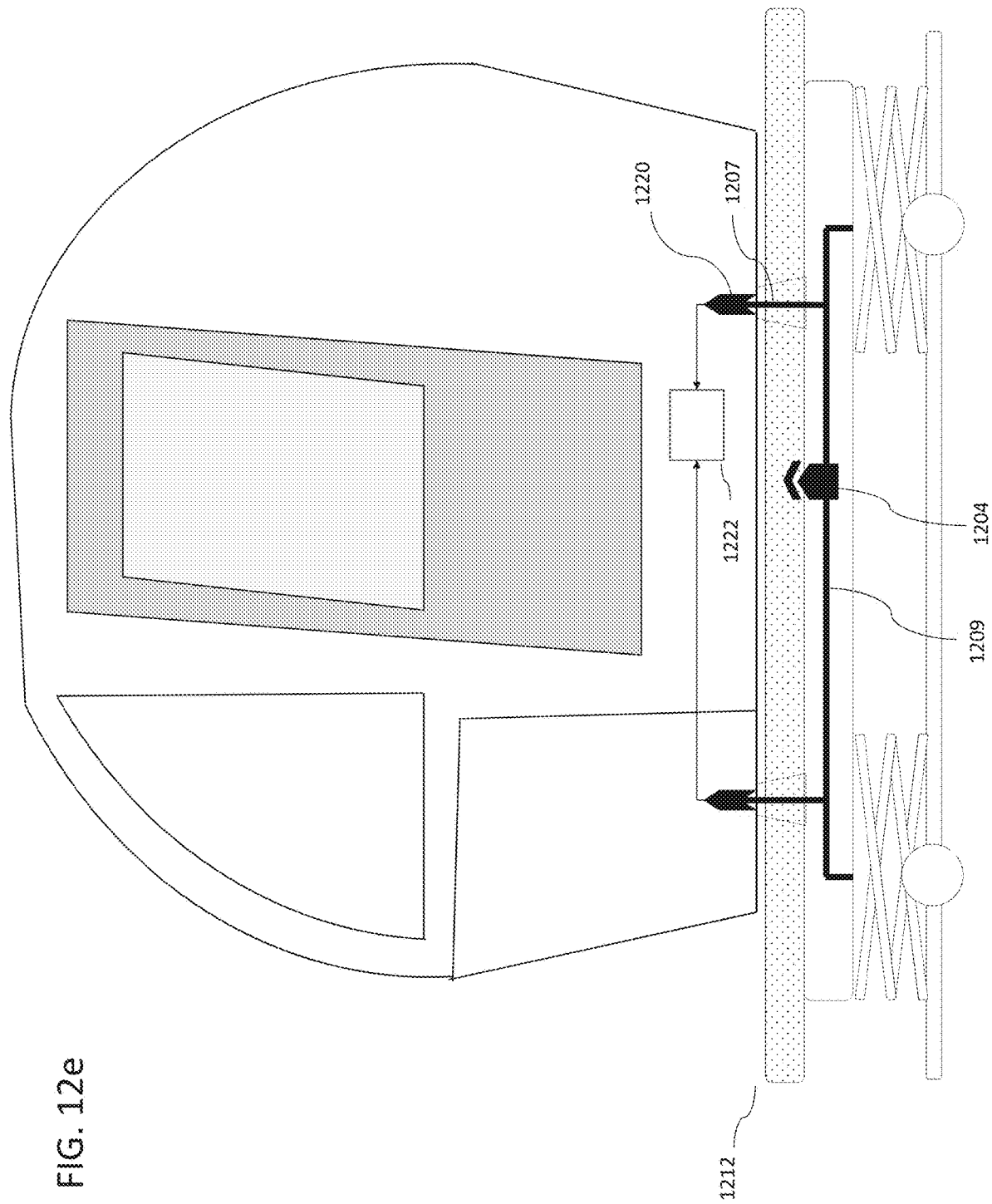

FIG. 12*e* illustrates the dolly, coupled to a swappable battery pack, carrying an AV. As can be seen, dolly electric interfaces 1207 are coupled with AV electric interfaces 1220, allowing energy transfer from dolly to AV. From AV electric interface 1220 energy is transferred to the AV power management system 1222. As can also be seen, all AV's weight is supported by dolly load-bearing structures 1206 and no forces are exerted on battery pack.

This unique architecture of dolly-battery-AV, including the unique mechanical and electrical interfaces, typically provides one or more of a number of advantages as follows.

The first and foremost advantage is the efficiency of the recharging process at the single-AV level. AV batteries recharging commences within seconds after its landing, and lasts throughout the vertiport cycle—taxiing from landing pad to arrivals gate, disembarkation, waiting in queue, boarding, taxiing to takeoff pad.

Second is the efficiency of the recharging process at the vertiport . . . . Since each AV is recharged on its dolly, recharging is not limited to a small number of recharging sockets, which is typically the case in air terminals, and can be performed in parallel on as many dollies as are available at the vertiport. The dolly in fact serves as a recharging intermediary or buffer. The AV is not required to be stationary and be attached to a socket at the recharging zone and can continue to be moved by the dolly while being recharged by it.

Third, since the battery is physically placed between the dolly and AV, it can supply power to both vehicles so is there is no need for a substantial power source on the dolly.

Fourth, since AV weight is not supported by the battery pack, the pack is free of load-bearing requirements which would be otherwise necessary to ensure its integrity in view of AV weight and inertial forces acting on it. Clearly, this can make the battery pack more weight efficient.

Fifth, the robustness and the fault-tolerance of the entire system. Since recharging processes are decoupled from the grid and indeed from each other, any grid malfunction such as power outage, or recharging malfunction of any kind on a single AV, will not have an immediate effect on the overall recharging process.

Sixth, as will be readily illustrated, placing the battery on top of the dolly allows a unique swapping and recharging mechanism.

Figure 13A:
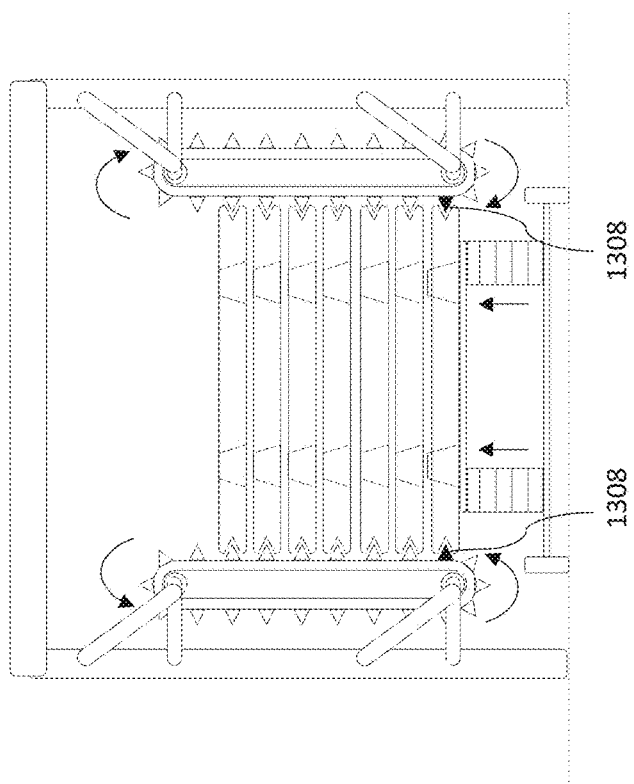
FIGS. 13a and 13b are schematic views of a battery pack swapping station.

FIG. 13*a* illustrates a schematic front view of a battery pack recharging and swapping station. The station enables loading, recharging, and unloading of several battery packs within a short time and a small floor area. A rigid frame 1302 supports two vertical belts 1306. Supported by these belts, spikes 1304 are attached to sockets of the stacked packs that are being recharged. These spikes serve the purpose of bearing the pack weight as well as providing an electric interface for the recharge. The two spikes 1308 are ready to receive and lift the next pack. The station is shown when a dolly in retracted mode, conveying an empty battery pack, has approached and aligned itself in a designated position essentially under the recharging packs.

Figure 13B:
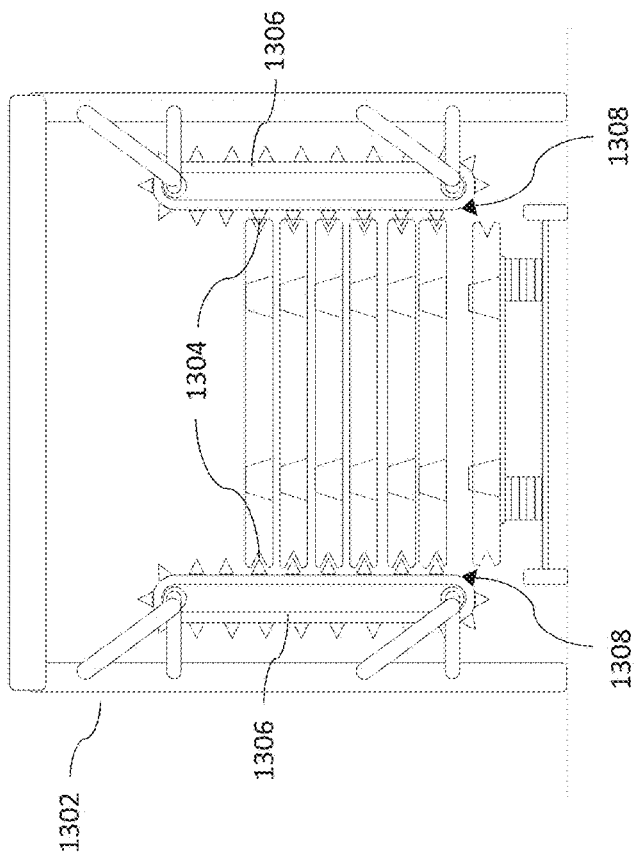

FIG. 13*b* illustrates the process of loading the empty battery pack from the dolly to the recharging station. Synchronized movements of the belts and the dolly lifting mechanism guide the two spikes 1308 into the pack's sockets, enabling the belt to lift the pack upwards together with the entire stack. The empty dolly then leaves the station and drives to another recharging station where a fully-charged pack is awaiting to be unloaded in a similar manner. At an air terminal, several such stations can be used to enable highly robust area-efficient operations as described above.

The principal functions of the dolly are taxiing the AV and charging the AV batteries. As previously detailed, in certain preferred embodiments, the dolly is automatically guided underneath the AV belly, heaves the AV and docks with the AV, establishing structural and electrical connection between itself and the AV, thus enabling taxiing the docked vehicle by means of the dolly automotive system and charging the AV batteries from the dolly energy resources, such as batteries. The above design and functionality may be split into more than one unit, for example by providing a taxiing dolly and a separate charging dolly. The taxiing dolly may automatically dock with the AV. According to various design options, the charging dolly may automatically dock with the taxiing dolly or directly with the AV. There are distinct advantages to the split design: (a) The charging dolly is not needed, and therefore not utilized, during the taxiing from the landing pad to the arrivals gate and from the departure gate to the take-off pad, but only throughout the charging and queuing zone and (b) The charging dolly does not need to fit underneath the AV but can rather dock with either the rear side of the AV or with the taxiing dolly, a feature favorable from the point of view of more relaxed dolly battery volume limitations and thus a larger energy capacity as well as from the point of view of limiting the AV heaving height and enhancing AV stability during taxiing. The disadvantage of the split design is in its complexity, as both the charging dolly and the taxiing dolly have to be provided with automotive systems of their own, as well as means for guidance, navigation, control and docking.

A further inventive design of the AV provides deployment of at least one propulsive element by linear motion by a suitable actuator along a substantially horizontal axis and the deployment of the other propulsive elements by rotation around a substantially vertical axis. Such design is of particular interest in pentacopter or hexacopter configurations. Any of the arms deployed by rotational or linear motion may be provided with a single motor-rotor arrangement or with a pair of motor-rotor arrangements. The movement of the propulsive elements according to such design is in a substantially horizontal plane. More than one tier of propulsive units may be arranged according to such design above the cabin.

The Vertiport as described in the previous sections is in particularly adapted to rooftops in dense urban areas. Whenever area limitations are less stringent, such as in suburban or rural areas, the Vertiport can be implemented on ground surface level with a functionality as described above and with multiple take-off/landing pads in conjunction with a limited number of passenger terminals, each of them adjacent to a queuing/charging zone. The passenger terminals provide maximum convenience to the passengers. There could be several departure and arrival gates at each terminal. The compactness of the AV with stowed propulsive units is a key factor in enabling of handling a large number of AV's docked to dollies at the queuing/charging zone. At this type of Vertiport, the distance between the terminal and the take-off/landing pads, as well as the number of take-off/landing pads served, may be considerably larger than in the case of rooftop Vertiports. The docked configuration of AV/dolly is a key enabler for this type of Vertiport, requiring no land infrastructure, unlike the case of a conveyor system between the Terminal and the take-off/landing pad which involves high infrastructure expenses in particular as the distances increase.

The entire handling of the AV at the Vertiport from touch-down to take-off is preferably controlled by a Vertiport central computer. The Vertiport central computer has a secure communications connection to the Central Flight Traffic Control System, which handles the individual travel tasks, including planning detailed travel routes for each task. Such travel routes also include contingency landing routes at predetermined contingency locations in case that there is a need to deviate from the planned route due to reasons such as technical faults, weather or passenger in-flight special request. All travel routes are loaded through the Vertiport computer system to the Air Vehicle computer system prior to take-off. After take-off, the AV will fly autonomously to its predetermined destination. Autonomously in this context means that no human piloting is necessary and that continuous communication to the flight control system is not necessary. The navigation during the autonomous flight might be achieved through any one, or combination, of the techniques of GPS, INS, terrain following (optical, radar) known to the persons familiar in the field of navigation or a combination thereof. The AV is preferably provided with sense-and-avoid systems to enhance safety in case of any disturbance or deviation from the scheduled route of any of the Air Vehicles in the surroundings.

Accordingly, the system may provide an effective solution to transportation problems, in cases in which the Point of Origin and the Point of Destination are conveniently accessible (for example commuting between a railway station to a downtown roof-top landing site). The design with automatically stowable propulsion systems enables convenient handling of the AV from its landing point (which might be outdoors, on rooftops) to sites of disembarkation (which might be conveniently indoors), energy provisioning and parking and thereby enables high transportation throughput with a high level of comfort.

Beyond ground footprint considerations, it may be preferable to limit the width of the AV to a value compatible to standard road transportation requirements, preferably less than 2.6 meters. Meeting such limitation may enable transporting the AV to other locations, for example for depot servicing. Furthermore, it may enable the AV docked with the dolly to transport passengers to short distances on smooth uninclined roads from ground level landing pads to ground destinations such as for example passenger terminals in sub-urban/rural areas as well as further destinations in ranches, beaches or recreational facilities.

Providing the dolly, or more generally any type of ground vehicle chassis as per a further aspect of this invention with advanced suspension systems and/or with flywheel-type stabilization systems may enhance the road-ability and stability of the AV docked to such chassis and thus enable a broader profile of ground usage.

An integrated ground-air transportation system according to this aspect of the present invention includes an aerial vehicle (AV) which has a passenger cabin for receiving at least one passenger, a propulsion system with a number of propulsion units, and an aerial vehicle controller. The propulsion system is configured to propel the aerial vehicle for powered flight including vertical take-off and landing (VTOL). The system also includes a ground vehicle assembly (or stand-alone ground vehicle or SGV) with at least three (and typically four) wheels, and with a drive unit in driving interconnection with at least one, and typically a pair, of the wheels. In this context, the "drive unit" can be any arrangement which can transfer driving power to a wheel, whether an electric motor directly connected to the wheel axle or whether a mechanical driving connection through gears, belts and/or chains to a motor or other source of motive force located anywhere else in the system.

The integrated ground-air transportation system assumes alternately: a first "docked configuration" in which the AV is secured to the SGV to form a passenger-carrying ground vehicle for traveling one part of a passenger journey; and a second "undocked configuration" in which the AV is separate from the SGV for carrying a passenger in powered flight for another part of a passenger journey.

Docking may include connecting the two vehicles mechanically and electrically, including drive-by-wire interface, communication interface and battery charging/fueling interface. Docking may also include integration of the control systems of both vehicles. Furthermore, docking may also include connecting the utilities of both vehicles, including electric power and fuel systems in order to facilitate effective usage and recharge/refueling. In certain implementations, interconnection of a power train for transferring mechanical drive power from a motor or engine located in the AV to the SGV may also be provided.

Most preferably, the docking process is done cooperatively through one interactive control system which may include elements such as sensors, actuators and processors of both the AV and the SGV.

In docked configuration, a passenger may safely and conveniently enter to and exit from the passenger cabin of the AV and thus embark/disembark from the vehicle. The integrated ground vehicle may be driven by an occupant of the AV passenger cabin or may travel autonomously (whether manned or unmanned) with remote control from a TCC (Traffic Control Center).

The integrated ground vehicle is required to travel on paved and possibly unpaved roads and is required to be able to safely withstand all conditions related thereto (such as bumps, collisions, vibrations, braking, turn-overs) to the same extent as required for a regular ground vehicle. In other words, the docked configuration (consisting of two vehicles—AV and SGV) must be as safe to travel as one vehicle according to all requirements from a land vehicle. Alternatively stated, the AV, when part of the integrated ground vehicle, must be "roadable". In order for the AV to meet such requirement, it may be necessary to stow some of its elements (such as propulsive systems) that when in flight configuration exceed the dimensional envelope as dictated by the ground travel requirements. Dimensional requirements for ground vehicles to be roadable are detailed for example by the European Union at the website: https://ec.europa.eu/transport/modes/road/weights-and-dimensions_en It is to be noted that the AV and SGV may be in communication with each other during the docking and undocking process through wireless (e.g. radio-frequency and/or optical) communication links. The same links may be active also in the docked configuration in addition to or in lieu of wired communication.

Docking between the two stand-alone vehicles is a guidance operation that may be done in a double-active cooperative manner. Most preferably, docking is an autonomous, automatic operation. The joint docking system preferably includes (a) the interconnected communicating docking systems of both vehicles which may be provided with a multitude of sensors assessing the relative position of the vehicles as the AV docking port is being brought close to the SGV docking port at minimal relative velocity, and (b) a set of actuators for accurate positioning and alignment as well as a set of autonomous actuators for securing (structural connection and locking) and subsequently utilities connection. All these actuators are preferably provided to the ground vehicle which is much less weight-sensitive than the AV.

The landing phase (touchdown) is separated from the phase of positioning and securing to the SGV. The landing is performed on the ground with relaxed accuracy, outside the footprint of the chassis and the positioning and securing onto the SGV are performed after an arbitrary time interval from landing.

Figure 14B:
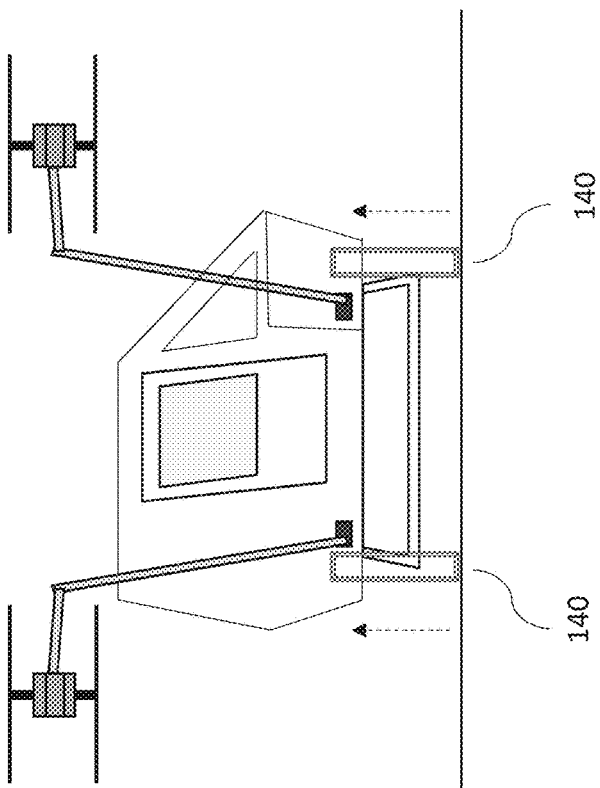
FIGS. 14a and 14b are side views of a further embodiment of the present invention, with the AV, shown with adjustable legs retracted and extended, respectively.
Figure 14A:
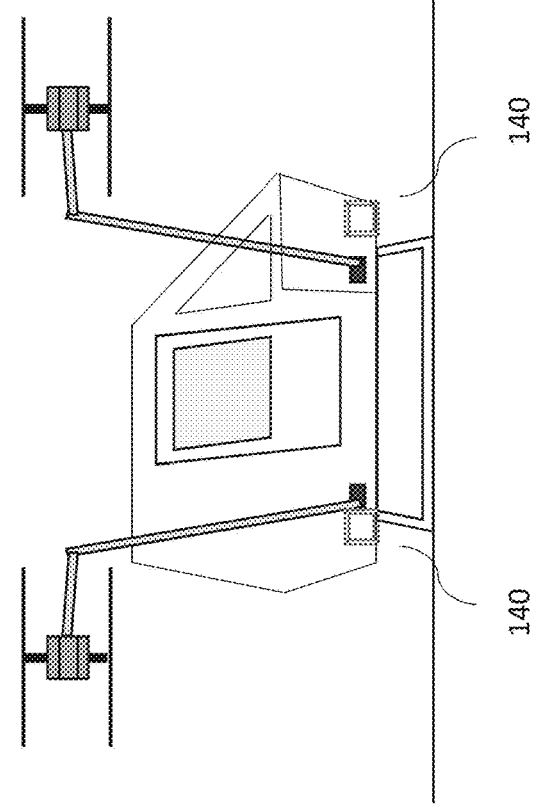

Automatic stowing of the propulsive units is a key enabler for seamless transition in a short time period from air travel to ground travel According to a further embodiment, the AV may land at a location different than the location of SGV and the chassis might be moved, preferably autonomously, onto the landing location of the AV. In addition to the skids, the AV may be provided with several telescopic legs, preferably two front legs and two aft legs. FIGS. 14a and 14b describe the AV in ground position and in elevated position. In ground position (FIG. 14a), the telescopic legs 140 are retracted, preferably to within the cabin body, and therefore do not contact the ground. In the elevated position of FIG. 14b, the telescopic legs are extended in order to heave the AV to a height corresponding to its position on the SGV. This docking process may also be used for docking with a dolly, as described above in the context of the vertiport configurations.

FIGS. 15a-15h describes a preferred horizontal docking sequence. After the AV lands on the ground (FIG. 15a), as the SGV 40 is accurately guided onto the AV. Accurately guiding the SGV onto the AV may be facilitated by guidance techniques as taught in the paper Perception and Control Strategies for Autonomous Docking for Electric Freight Vehicles, Leopoldo Gonzalez Clarembaux et al., Transportation Research Procedia 14 (2016) 1516—1522 6th Transport Research Arena Apr. 18-21, 2016 which is incorporated by reference in its entirety. As the SGV approaches the AV, the AV telescopic legs 140 are extended in order to heave the AV belly to the corresponding height of the mating surface atop the SGV (FIG. 15b). The SGV moves horizontally until its mating top surface starts to overlap with the AV belly, with a minor height difference between them (FIG. 15c). Thereafter, the AV fully retracts the aft legs so that the SGV's mating surface contacts and supports the AV belly (FIG. 15d). At that time, the AV front legs are also slightly retracted in order to keep the AV belly in a horizontal position at the SGV top surface level.

Once the aft legs are retracted, the SGV resumes its movement beneath the AV and advances towards the front legs (FIG. 15e). As the SGV moves further, an increasing supportive overlap is achieved between its belly and the SGV, and furthermore, once the horizontal projection of the center of gravity of the AV is within the overlap area, the front telescopic legs are fully retracted (FIG. 15f) and at that point the AV is fully supported by the SGV. However, once all legs are retracted the AV is no longer in contact with the ground so there is a need for a mechanism for final positioning of the AV atop the SGV (FIG. 15g). For example, this mechanism may be a rack and pinion device. The pinions attached to the AV belly, driven by small electric motors, are engaged with racks on the SGV top. After completing the accurate positioning, the AV is structurally secured to the SGV using latching/anchoring actuators and subsequently utilities (electrical power, fuel, coolant), control and communication interconnections are established between the AV and the SGV. After that the AV arms are folded (FIG. 15h).

The ability to fold the arms and rotors laterally above the roof about an essentially-vertical rotation axis is a major advantage from many perspectives.

First advantage is the enhanced safety at take-off and at landing. The processes of folding and unfolding of the arms, and more importantly rotation of the rotors, are all performed clear of the ground (typically above 2 m). This clearance is important since those movements do not endanger passengers which are typically abundant in busy transportation terminals—waiting for embarking, disembarking, etc.

Second, when folded above the cabin roof, folded arms and rotors do not obstruct the entry and exit of passengers. This enables the passengers, in folded position, to (a) embark and disembark, and (b) remain seated inside the vehicle without the fear of being trapped inside the vehicle in case of a technical malfunction that prevents the arms from being stowed.

Third, this enables convenient parking. When the arms and rotors are folded, they are essentially out of reach of by-passers and therefore do not pose a hazard to them, nor are in danger of being jeopardized. This enables parking the vehicle in standard-size parking places, either in standard rooftop parking lots or in parking lots designated for this use.

Fourth, when rotating the propulsive elements around a vertical axis, the only two forces acting against this movement are friction and inertia (similarly to opening or closing of a standard door). In contrary, when rotating the propulsive elements around a non-vertical axis, gravity also acts to resist this movement either at folding or at unfolding and this requires exerting forces which are an order of magnitude higher than those required to overcome inertia and friction alone. This requires substantial motors to be implemented for folding or unfolding which is unfavorable in terms of weight, vehicle design, folding or unfolding time and energy consumption.

As already outlined before, the Air Vehicle per the present invention has two configurations:

1. The Flight Configuration (for example stand-alone multicopter with unfolded propulsive units). It should be noted that in the flight configuration the Air Vehicle may be outfitted with elements which do not participate in the ground configuration.
2. The Ground configuration (for example multicopter with stowed propulsive units docked with dolly or chassis).

It should be noted that, as part of the conversion from Ground Configuration to Flight Configuration, the flight configuration the Air Vehicle may be outfitted with elements which do not participate in or pertain to the ground configuration, for example, structural elements or safety elements such as supporting bars, rings, shrouds or propulsive elements. All such elements are available close to the take-off/landing pads preferably stored in component banks with the aid of robots, rather than being taxied to the passenger terminal as part of the ground configuration.

It is to be emphasized that conversion or switching between the configurations is inherently a ground operation (pre-take-off or post landing), may advantageously be performed or facilitated by robots and is preferably performed automatically. For sake of completeness and clarity, it is to be noted that there exist different configurations of Air Vehicles with tiltable rotors which feature mechanical and aerodynamic transitions during flight. These AV's typically suffer from considerable complexities and hazards in aspects such as flight control and structural integrity throughout the transition. In contrast, reconfiguration of AV's according to preferred implementations of the present invention is performed on the ground, and the airframe (including positioning of propulsion units relative to the cabin) preferably remains fixed and rigid throughout the flight. Hence all the complexities and hazards associated with mechanical and aerodynamic transitions during flight are obviated.

A Vertiport design of particular interest according to a further aspect of the present invention features removal from the air vehicle of propulsive units and supportive structural units, storing them in component banks and taxiing the Ground Configuration away from the flight deck for further operations such as disembarkation, energy provisioning and queueing, after which, according to traffic demand, embarkation, taxiing to the flight deck and converting it into Flight configuration, preferably by robotic operation and take-off is to take place. The conversion, including possible outfitting with components retrieved from the components bank, may be done in several phases and locations on the flight deck.

There are various considerations affecting the choice of the design to be adopted according to the above-described embodiments. In cases of usage profile which are less sensitive to real estate resources necessary for operating the system, there is no necessity to stow the propulsive units. For such implementations, an AV may be constructed to be similar to any of the above-described implementations but without mechanisms for stowing the propulsive units. The permanent layout of the rotors above cabin roof level may be such as described in the deployed state in any of the above implementations. The supporting arms connecting the propulsive units to the bottom of the vehicle may be such as described for the deployed state in any of the above implementations.

The supportive arms may be interconnected, for example as depicted in FIGS. 8a-8g and furthermore even connected to upper parts of the cabin structure, for the purpose of the interconnecting structure to take part of the static and dynamic loads which are otherwise fully supported by the arms. Such interconnection may lead to overall weight saving, with all the beneficial consequences thereof. Such interconnection is optional and may depend on the specific design requirements and limitations of the cabin. Furthermore, in the case of non-stowable propulsive system design, it may be beneficial and possible to encompass at least part of the rotors with shrouds. The shrouds may be structurally connected to the supportive arms and the interconnecting structure.

It should be noted that the various embodiments and implementations of the invention described herein are not mutually exclusive, and that features described in the context of one implementation may be combined with any and all features of another implementation, all as will be clear to a person ordinarily skilled in the art.

It will be appreciated that the above descriptions are intended only to serve as examples, and that many other embodiments are possible within the scope of the present invention as defined in the appended claims.

It will be appreciated that the above descriptions are intended only to serve as examples, and that many other embodiments are possible within the scope of the present invention as defined in the appended claims.

What is claimed is:

1. An air transportation system comprising:
    (a) a plurality of aerial vehicles each comprising a passenger cabin for receiving at least one passenger and a propulsion system comprising a plurality of propulsion units; and
    (b) a robotic system comprising a plurality of handling robots configured for autonomously approaching and docking with the aerial vehicles while not in flight, wherein said handling robots are configured for conveying the aerial vehicles between areas of a vertiport,
    wherein the aerial vehicle and said handling robots are configured to allow a single one of said handling robots, after the aerial vehicle has landed, to autonomously enter beneath the aerial vehicle, engage the aerial vehicle and raise the entirety of the aerial vehicle so that the aerial vehicle is supported solely by said single handling robot for conveying between areas of the vertiport.

2. The system of claim 1, further comprising a vertiport including:
    (a) an embarkation area for at least one passenger to board the aerial vehicle; and
    (b) a take-off area for the aerial vehicle to take off, wherein said handling robot is configured for conveying the aerial vehicle between the embarkation area and the take-off area.

3. The system of claim 2, wherein said vertiport further comprises a buffer area for accommodating a plurality of aerial vehicles, said handling robot being configured for conveying the aerial vehicle from the buffer area to the embarkation area.

4. The system of claim 2, further comprising an energy provisioning area with external energy resources, wherein said handling robot is configured for conveying the aerial vehicle between the embarkation area and the energy provisioning area.

5. The system of claim 1, wherein said aerial vehicles have elastic shock-absorbing landing gear, and wherein said handling robot is configured to engage and lift a structure of the aerial vehicle without transferring load via said landing gear.

* * * * *